(12) United States Patent
Huang et al.

(10) Patent No.: US 7,346,461 B2
(45) Date of Patent: Mar. 18, 2008

(54) SYSTEM AND METHOD OF ANALYZING VIBRATIONS AND IDENTIFYING FAILURE SIGNATURES IN THE VIBRATIONS

(75) Inventors: Norden E. Huang, Bethesda, MD (US); Liming W. Salvino, Rockville, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/251,004

(22) Filed: Sep. 30, 2005

(65) Prior Publication Data

US 2007/0078611 A1    Apr. 5, 2007

(51) Int. Cl.
*G06F 19/00* (2006.01)
*G01H 17/00* (2006.01)
(52) U.S. Cl. .......................................... 702/56; 73/570
(58) Field of Classification Search .................. 702/56, 702/33, 35, 75–76, 190, 194, 195, 199; 73/570, 73/577, 579, 582, 588; 703/1, 2
See application file for complete search history.

(56) References Cited

U.S. PATENT DOCUMENTS

| | | | |
|---|---|---|---|
| 5,983,162 A | 11/1999 | Huang | |
| 6,192,758 B1 * | 2/2001 | Huang | 73/579 |
| 6,311,130 B1 * | 10/2001 | Huang | 702/2 |
| 6,507,798 B1 * | 1/2003 | Salvino et al. | 702/75 |
| 6,862,558 B2 | 3/2005 | Huang | |
| 7,054,792 B2 * | 5/2006 | Frei et al. | 702/190 |

OTHER PUBLICATIONS

Kizhner et al., On the Hilbert-Huang Transform Data Processing System, Mar. 6-13, 2004, Aerospace Conference, vol. 3, pp. 1961-1979.*

Qiang et al., Processing Time-Varying Signals by a New Method, 2001 IEEE, pp. 1011-1014.*

Kizhner et al., On the Hilbert-Huang Transform Data Processing System, Mar. 6-13, 2004, Aerospace Conference, vol. 3, pp. 1961-1979.*

* cited by examiner

*Primary Examiner*—John Barlow
*Assistant Examiner*—Toan M. Le

(57) ABSTRACT

An apparatus, computer program product and method of analyzing structures. Intrinsic Mode Functions (IMFs) are extracted from the data and the most energetic IMF is selected. A spline is fit to the envelope for the selected IMF. The spline derivative is determined. A stability spectrum is developed by separating the positive and negative results into two different spectra representing stable (positive) and unstable (negative) damping factors. The stability spectrum and the non-linearity indicator are applied to the data to isolate unstable vibrations.

42 Claims, 23 Drawing Sheets

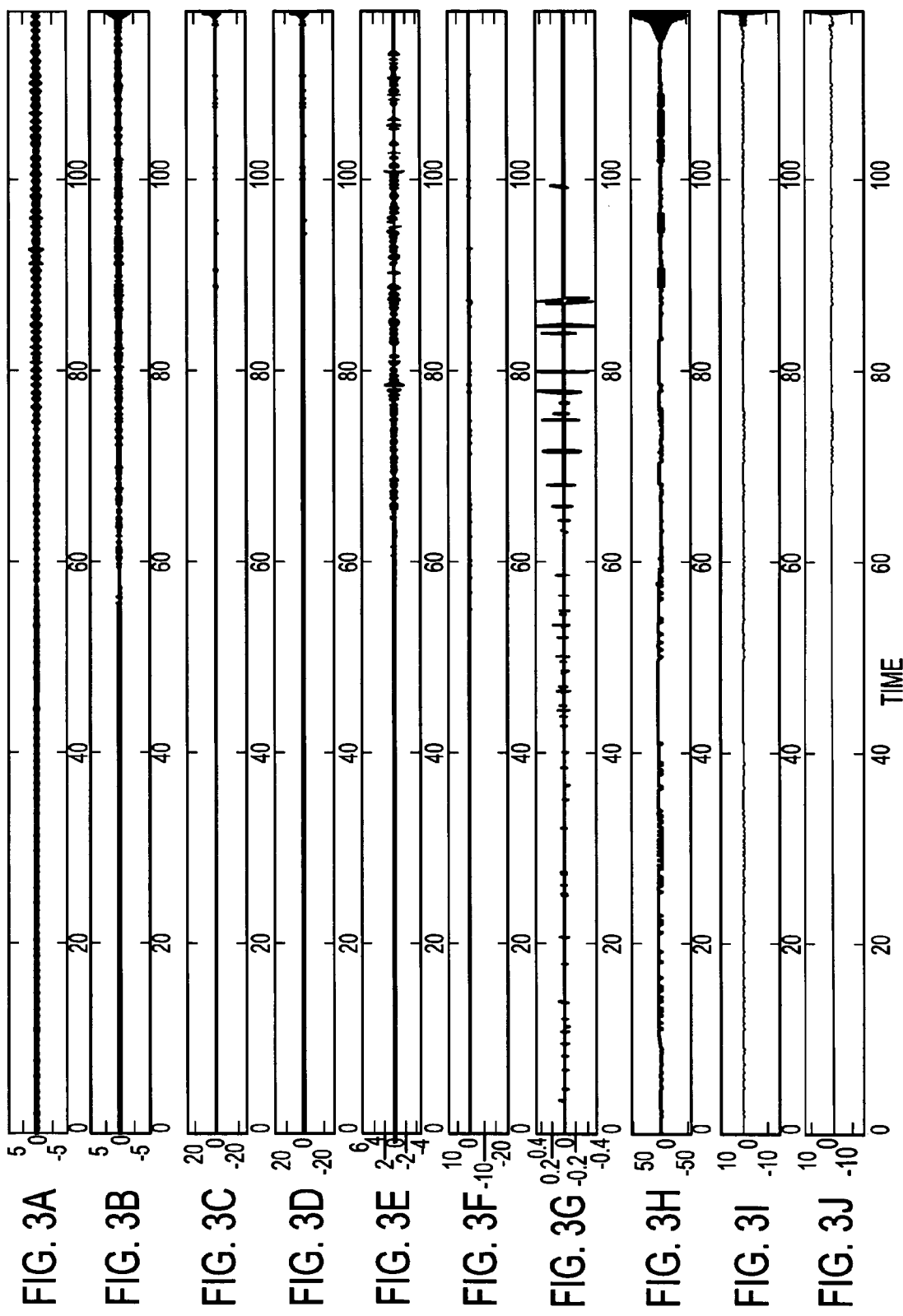

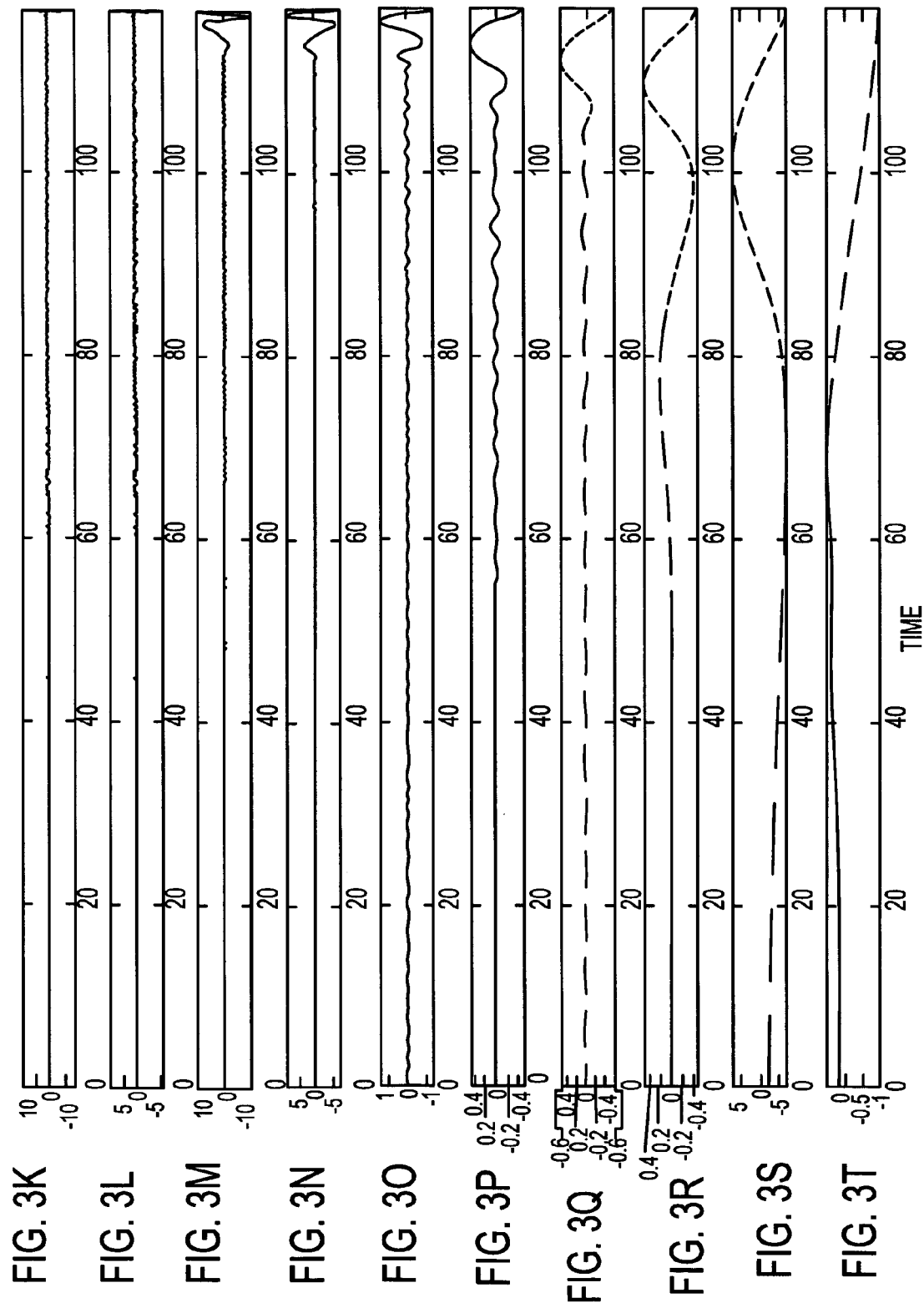

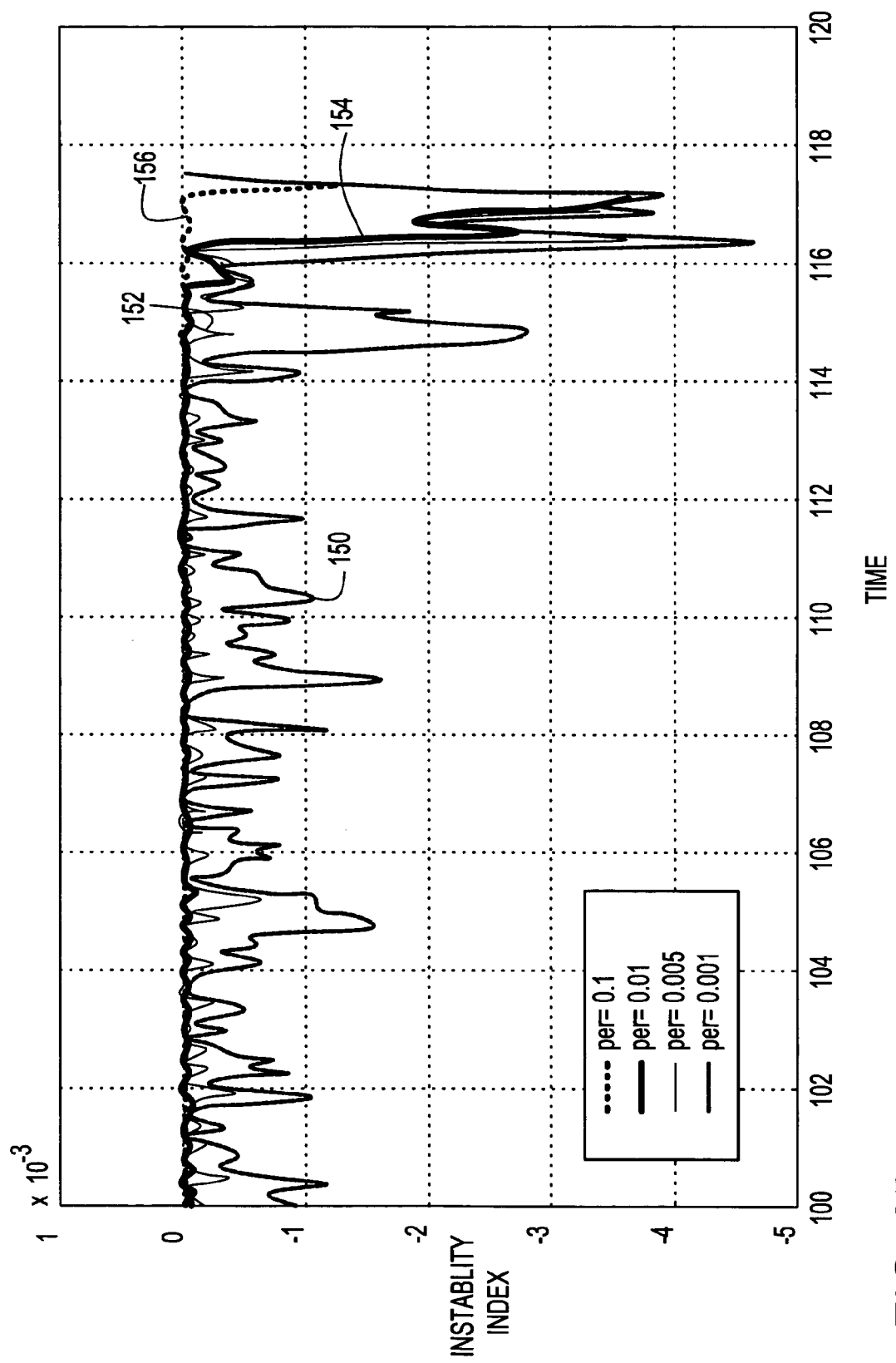

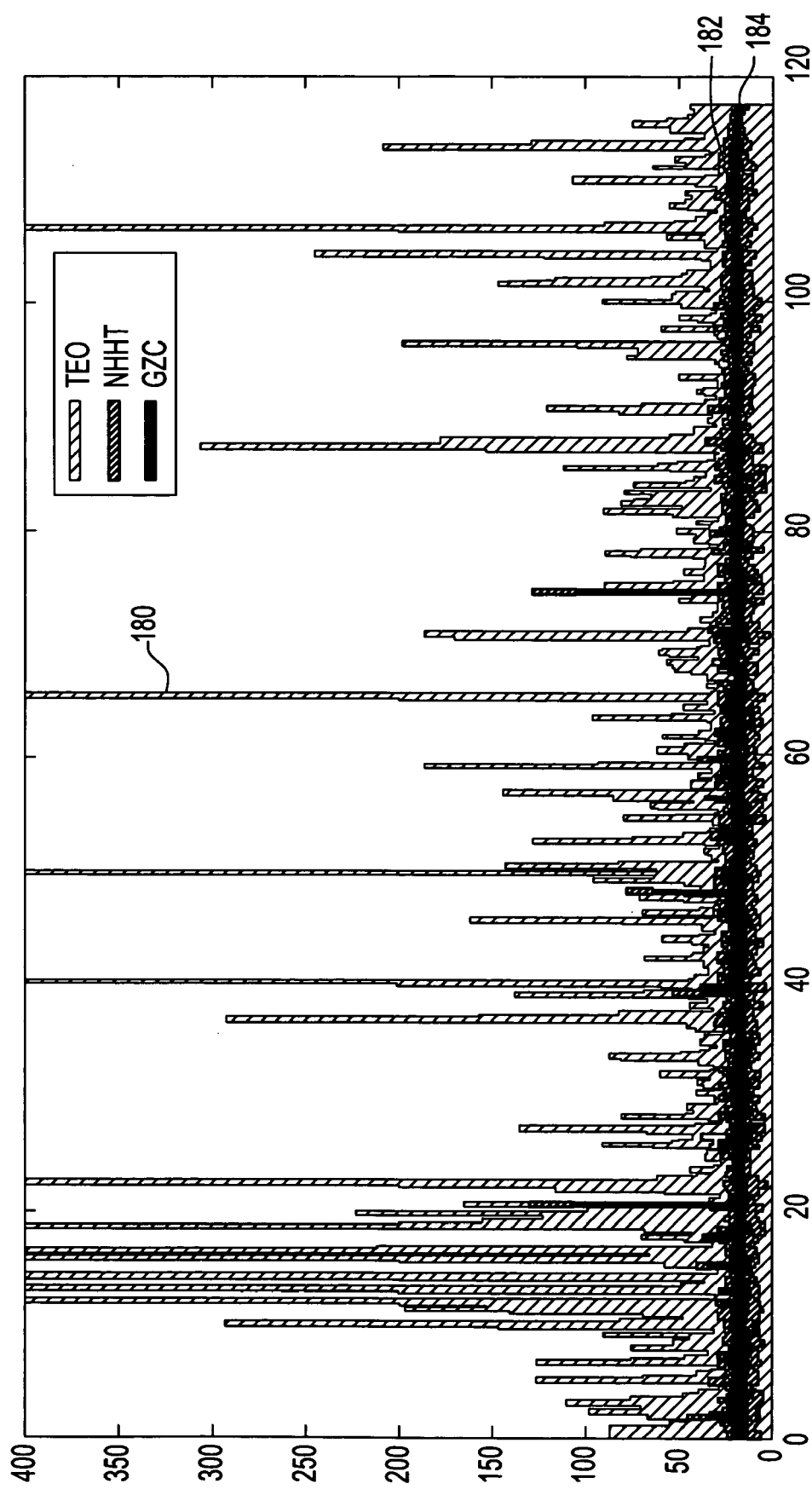

SYSTEM AND METHOD OF ANALYZING VIBRATIONS AND IDENTIFYING FAILURE SIGNATURES IN THE VIBRATIONS

ORIGIN OF THE INVENTION

The invention described herein was made by employees of the United States Government, and may be manufactured and used by or for the Government for governmental purposes without the payment of any royalties thereon or therefor.

REFERENCE TO COMPUTER PROGRAM LISTING

A computer listing labeled ISSpec.txt is fixed on a computer disc (CD) that is appended hereto and is being fixed herewith, the contents of which are incorporated herein by reference in their entirety.

BACKGROUND OF THE INVENTION

1. Field of the Invention

The present invention is generally related to a data analysis method, apparatus and article of manufacture and more particularly to an apparatus, article of manufacture and analysis method for measuring and analyzing vibrations and identifying failure signatures in the vibrations.

2. Background Description

System efficiency is a measure of the energy expended in performing a task with respect to the energy consumed by the system to perform the task. Energy may be lost, for example, thermally (e.g., as heat), optically (e.g., as light) or mechanically (e.g., as vibrations). Besides dissipating energy to reduce efficiency, vibrations can stress a structure to the point of failure. Thus, designers commonly resort to various design methods to reduce and minimize vibration. However, system dynamics may cause vibration, i.e., where time varying forces induce system vibrations. Consequently, structural vibrations can never be totally avoided or eliminated.

The renowned Tacoma Narrow Suspension Bridge is one well-known example of deleterious vibrations in a structure. Wind caused the bridge to vibrate at resonance. During a period of sustained high wind, the wind re-enforced the resonant vibrations. The bridge oscillation magnitude continually increased until a structural failure occurred and the bridge collapsed. Although most bridges sway in the wind to some extent, most do not collapse from the swaying. Unfortunately, no one had any idea that wind would cause the collapse of Tacoma Narrow Suspension Bridge. Otherwise, officials could have taken steps to address that instability, e.g., introduce members to change the resonant frequency or, at least, to dampen the vibrations that caused the bridge to sway.

So, while vibrations may be unavoidable, monitoring and analyzing vibrations, whether in the overall system or in a single structural member, can provide valuable insight and additional information regarding the dynamic characteristics of the structure/system. Every structural member has a natural resonant frequency that is related in part to its stiffness. Typically, material stiffness changes just prior to failing. For example, when bending a wire back and forth, one may notice that the wire gets softer just before it breaks. So, since one may determine changes in stiffness by measuring vibration frequency, measuring vibration frequency has proven to be one valuable indication for non-destructive health monitoring. The time-frequency distribution of vibrations in machinery as well as in static structures also have been analyzed to determine structural damping characteristics with respect to system dynamics.

Though a number of approaches are available for studying structural vibrations, unfortunately, those approaches do not separate stabilizing, dampening vibrations from de-stabilizing vibrations or vibrations that indicate instability. Further, those approaches typically, do not provide consistently reliable dampening predictor indications.

In particular, it is important to understand vibrational instability in modern airborne structures. State of the art aircraft materials and aircraft construction methods have led to structures that are lighter in weight but also are reduced in stiffness. Consequently, these aero-elastic design materials have such reduced stiffness that the resulting structures are susceptible to structural dynamics problems, specifically the onset of instability. Unfortunately, adequate tools are unavailable to predict stability margins for these structures, especially, tools applicable to understanding structural dynamic instabilities such as flutter. It is critical to flight safety in particular to have valid flight flutter prediction techniques that can determine the onset of instability in aero-elastic structures from the flight data.

Thus, there is a need for tools that reliably predict stability margins in aero-elastic structures applicable to structural dynamic instabilities such as flutter.

SUMMARY OF THE INVENTION

It is an aspect of the invention to reliably predict structural failures;

It is another aspect of the invention to characterize structural vibrations;

It is yet another aspect of the invention to identify changes in stiffness in vibrating structural members;

It is yet another aspect of the invention to identify changes in stiffness in a vibrating structural member that indicates the onset of a structural failure;

It is yet another aspect of the invention to identify changes in stiffness in a vibrating aero-elastic structure that indicates the onset of a failure of the aero-elastic structure.

The present invention relates to an apparatus, computer program product and method of analyzing structures. Intrinsic Mode Functions (IMFs) preferably are extracted from the data and the most energetic IMF is selected. A spline preferably is fit to the envelope for the selected IMF. The spline derivative preferably is determined. A stability spectrum preferably is developed by separating the positive and negative results into two different spectra representing stable (positive) and unstable (negative) damping factors. The stability spectrum and the non-linearity indicator preferably are applied to the data to isolate unstable vibrations.

BRIEF DESCRIPTION OF THE DRAWINGS

The foregoing and other aspects and advantages will be better understood from the following detailed description of a preferred embodiment of the invention with reference to the drawings, in which:

FIGS. 3A-T show IMF components, $c_j(t)$, extracted from the signal, $x(t)$;

FIGS. 8A-B show a summary view example of the effects of the cutoff limit selection;

FIGS. 11A-B, show a comparison of instantaneous frequency extracted using the Teager Energy Operator (TEO), NHHT and Generalized Zero-Crossing (GZC).

DETAILED DESCRIPTION

Figure 1:
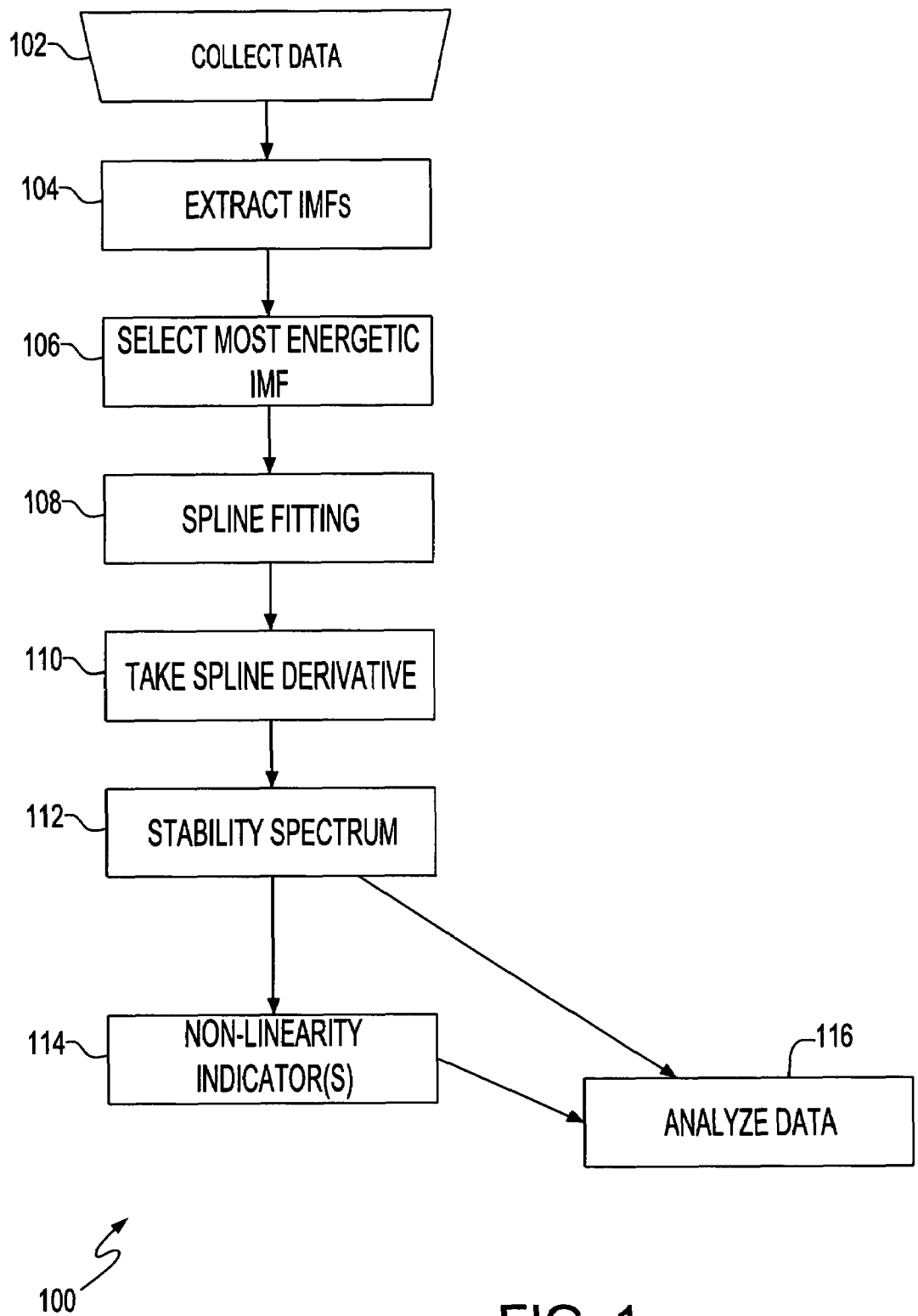
FIG. 1 shows a flow diagram example of steps in analyzing structural vibrations according to a preferred embodiment of the present invention.

Turning now to the drawings and more particularly FIG. 1 a flow diagram example 100 of steps in analyzing structural vibrations to identify changes in material stiffness according to a preferred embodiment of the present invention. In one embodiment, analysis begins in step 102 with collecting data. In step 104 Intrinsic Mode Functions (IMFs) preferably are extracted from the data. In step 106 the most energetic IMF preferably is applied to the most relevant frequency. In step 108 the envelope for the selected IMF preferably is defined using a spline function. Next, in step 110 the derivative of the spline function preferably is determined, which yields both positive and negative results. In step 112, a stability spectrum preferably is developed by separating the positive and negative results into two different spectra representing stable (positive) and unstable (negative) damping factors. Also, the stability spectrum may be filtered to remove data from low level vibrations and smoothed to remove quantization related inconsistencies. In step 114, a non-linearity indicator may be identified in the data. Finally, in step 116 the stability spectrum from step 112 and the non-linearity indicator identified in step 114 preferably are applied to the data to isolate unstable vibrations, that indicate a change in material stiffness and so, the onset of a failure.

Figure 2:
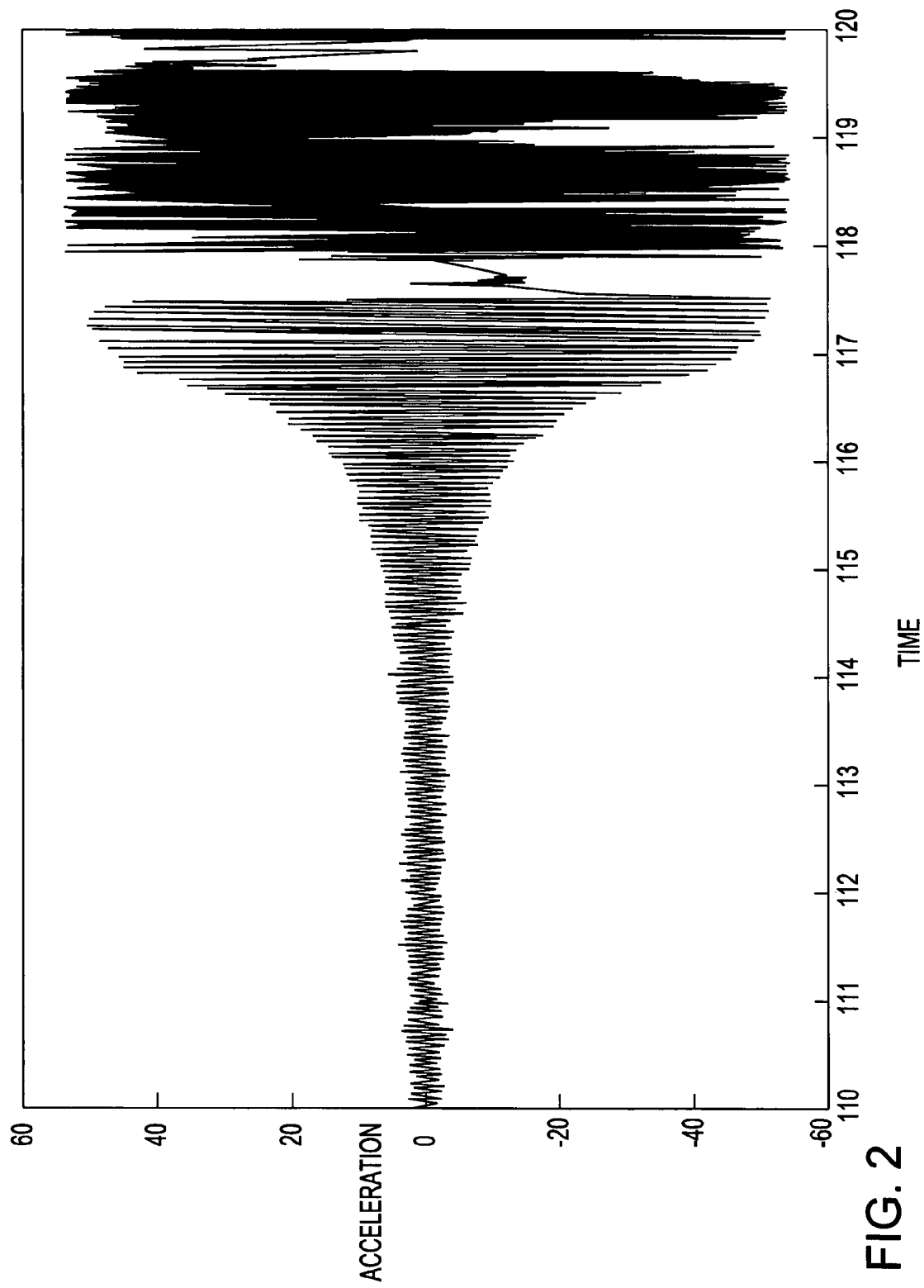
FIG. 2 shows an example of a segment of vibration test data collected at a drastic failure event.

Data collection may be effected in step 102 of FIG. 1 by connecting sensors, e.g., accelerometers, directly to a suitable general purpose computer that has been suitably equipped, e.g., with one or more analog to digital (A/D) converter(s). Alternately, the data may be collected, independently and the collected data may be passed to such a suitable general purpose computer. IMFs may be extracted from the data step 104, e.g., using the Hilbert Huang Transform (HHT) in Empirical Mode Decomposition (EMD) as described in U.S. Pat. No. 5,983,162, entitled "Empirical Mode Decomposition," to Norden E. Huang, assigned to the assignee of the present invention and incorporated herein by reference in its entirety. The positive and negative results may be separated in step 112, using a computer program such as the Instability Spectrum Analysis Program (ISSpec), which generates an instability spectrum (which is the complement of the stability spectrum) of the intrinsic mode functions. The ISSpec is fixed on a compact disc (CD) that is appended hereto, filed herewith, incorporated herein by reference in its entirety. Preferably, the damping factor is defined by the ratio of the derivative of the amplitude to the amplitude. So, damping factor values may dominate at the location where the vibration amplitude is small. Typically, however, when vibration amplitude is small, the energy in the vibrations may be low enough that energy density is of little dynamic consequence. Thus, an amplitude cutoff criterion may be used, e.g., by ISSpec, to ignore derivatives at low energy, so that the results are only from the vibrations with sufficient energy density. A non-linearity indicator may be identified in step 114, e.g., as described in U.S. Pat. No. 6,862,558 to Norden E. Huang, assigned to the assignee of the present invention and incorporated herein by reference in its entirety. Preferably, the Teager Energy Operator (TEO) and the Normalized Hilbert Huang Transform (NHHT), or the Generalized Zero-Crossing (GZC) techniques are applied to compute the instantaneous frequency of the data. Thereafter, a general non-linear indicator may be defined as a substantial difference (e.g., at least a factor of 2) in the calculated instantaneous frequency, as determined by the TEO and the NHHT or the GZC So, for example, FIG. 2 shows an example of a segment of vibration test data collected in step 102 of FIG. 1. The data shown is only that portion at the onset of a drastic failure event that occurred 117.5 seconds into the test. From this data signals may be extracted to indicate the oncoming failure according to an embodiment of the present invention. The data was collected from a flight test specimen from an F-15B Flight Test Fixture from a NASA flight experiment by NASA Dryden Flight Research Center to validate flight flutter prediction techniques. Although not shown in this figure, at test start the vibration data begins with relatively uneventful, normal or background vibration until at about 115 seconds into the test, vibrations begin to increase until the test terminates at about 117.5 seconds. Thus, that 2.5 second segment is of interest for analysis. Previously, dampening vibrations in such a structure was effected as a result of studying the structure using smoothing through a moving means for the data. See, e.g., U.S. Pat. No. 6,507,798 B1, entitled "Time-Frequency Dependent Damping via Hilbert Damping Spectrum" to Salvino et al., issued Jan. 14, 2003, assigned to the assignee of the present invention and incorporated herein by reference in its entirety.

However, in addition to providing an indication that structural vibration dampening as in Salvino et al., one embodiment of the present invention performs structural vibration analysis that distinguishes between dampened vibrations in a stable system and reinforcing or resonant vibrations in an unstable or marginally stable system. Further, structural vibration stability characteristics may be extracted from the raw data to indicate whether the structure is stable or unstable. Thus, these vibration stability characteristics can serve as an operational safety criterion indicator. In particular, according to an embodiment of the present invention, the damping definition is generalized over Salvino et al., for example, to include both positive damping (stable) and negative damping (unstable), and the improvement of the damping computation. Advantageously, thereafter, one may easily distinguish such differences that are indicative of material stiffness changes, and if warranted, take steps in stabilizing an unstable or marginal structure. Although the present invention finds utility in studying and eliminating structural vibrations, it is understood that the present invention has application to any oscillatory or dampening secondary effects in a physical system.

The test specimen from which the data in FIG. 2 was collected was the Aerostructures Test Wing (ATW), a NACA 65A004 airfoil with a wing area of 197 in$^2$ and an aspect ratio of 3.28. The wing skin was 3 plies of fiberglass cloth 0.015" thick and the wing core was rigid foam. Internally the wing had a spar at the 30% chord line, 1 ply, 0.005" thick graphite-epoxy at its tip and 10 plies, 0.05" thick at the root. The half span of the wing was 18 inches, with a root chord of 13.2 inches and a tip chord of 8.7 inches. The wing total weighed 2.66 pounds. A 1" diameter, 15" long graphite epoxy boom was attached to the wing. The boom included three internal accelerometers for collecting data (hereinafter ATW data) both in ground and flight-testing.

FIGS. 3A-T show IMF components, $c_j(t)$, extracted as described in FIG. 1 from the same ATW signal, x(t), that included the data segment of FIG. 2. EMD preferably is effected by filtering the digital data to extract IMFs in a manner analogous to electrically filtering harmonics or sifting sand with a mechanical sieve to separate aggregated sand particles according to their physical size. The digital signal data preferably are decomposed into a series of components according to their time scales with each component being an IMF. In particular, the signal can be decomposed through EMD as a sum of the IMFs with the form $$x(t) = \sum_{j=1}^{n} c_j(t) + r_n.$$

In this equation $r_n$ represents the residual signal.

Each IMF represents an oscillation or vibration mode embedded in the data, as defined by the zero-crossings and involves only one mode of oscillation that satisfies the following two conditions: (a) the number of extrema and the number of zero-crossings either must be equal or differ at most by one within the data, and (b) at any point, the mean value of upper envelope defined by the maxima and the lower envelope defined by the minima is zero. For the exemplary signal of FIG. 2, 19 IMF components are extracted from the signal in step 104 of FIG. 1, and the signal may be reconstructed from those 19 components. It is apparent that the eighth component of FIG. 3H is the most energetic component with an amplitude range of from −50 to 50. Thus, this eighth component is selected in step 106. It is also very apparent from these IMF components that the segment of interest is in the last couple of seconds.

Figure 4:
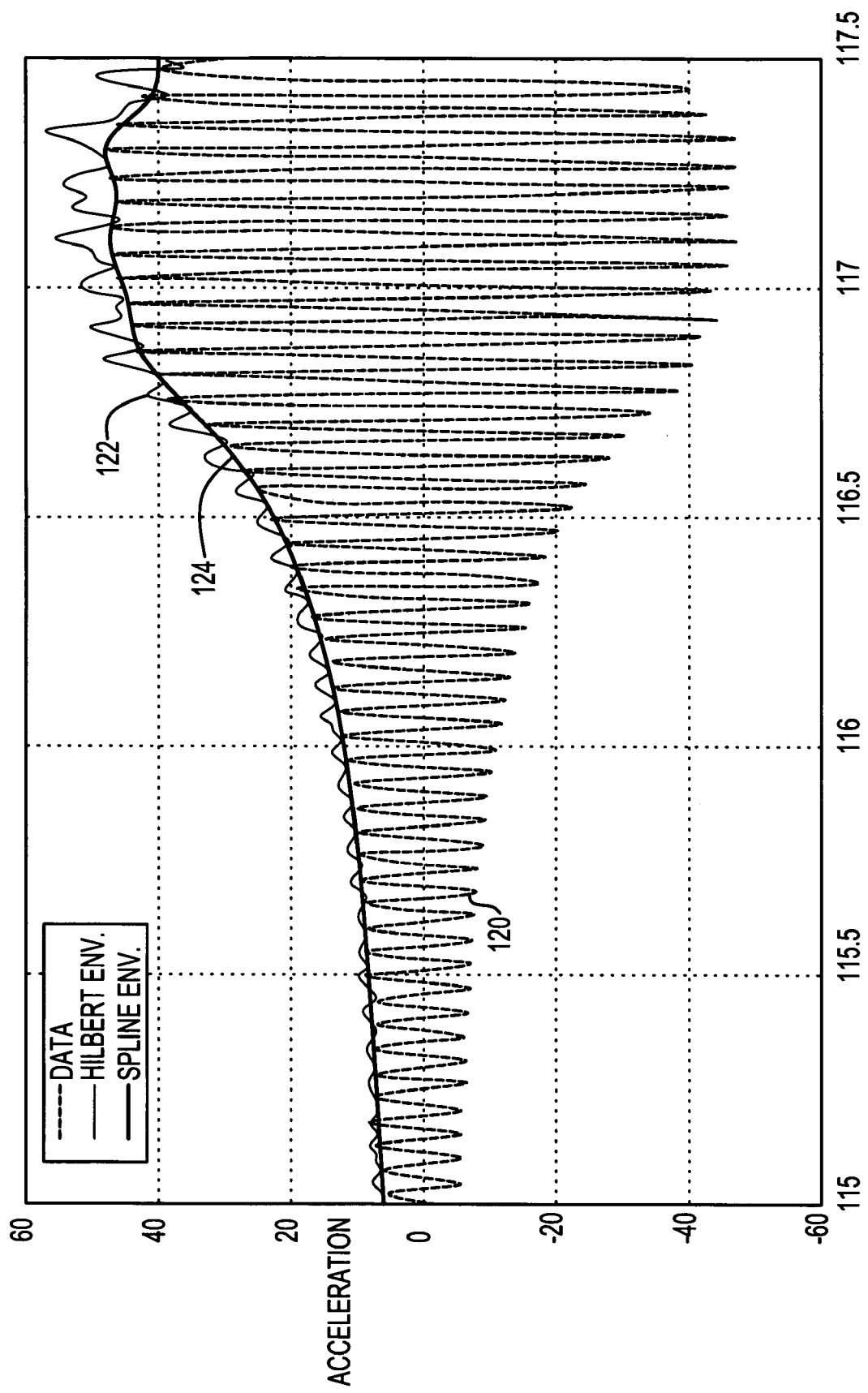
FIG. 4 shows the segment of interest of the test data, comparing the NHHT amplitude envelope with a preferred embodiment cubic spline amplitude envelope.

FIG. 4 shows the segment of interest 120 of the ATW data, comparing the NHHT amplitude envelope 122 with an exemplary cubic spline amplitude envelope 124 from step 108 of FIG. 1. Hilbert transform envelope 122 shows clear amplitude modulation with significant ripple, i.e., a frequency component. However, the cubic spline envelope 124 has relatively little ripple.

Figure 5:
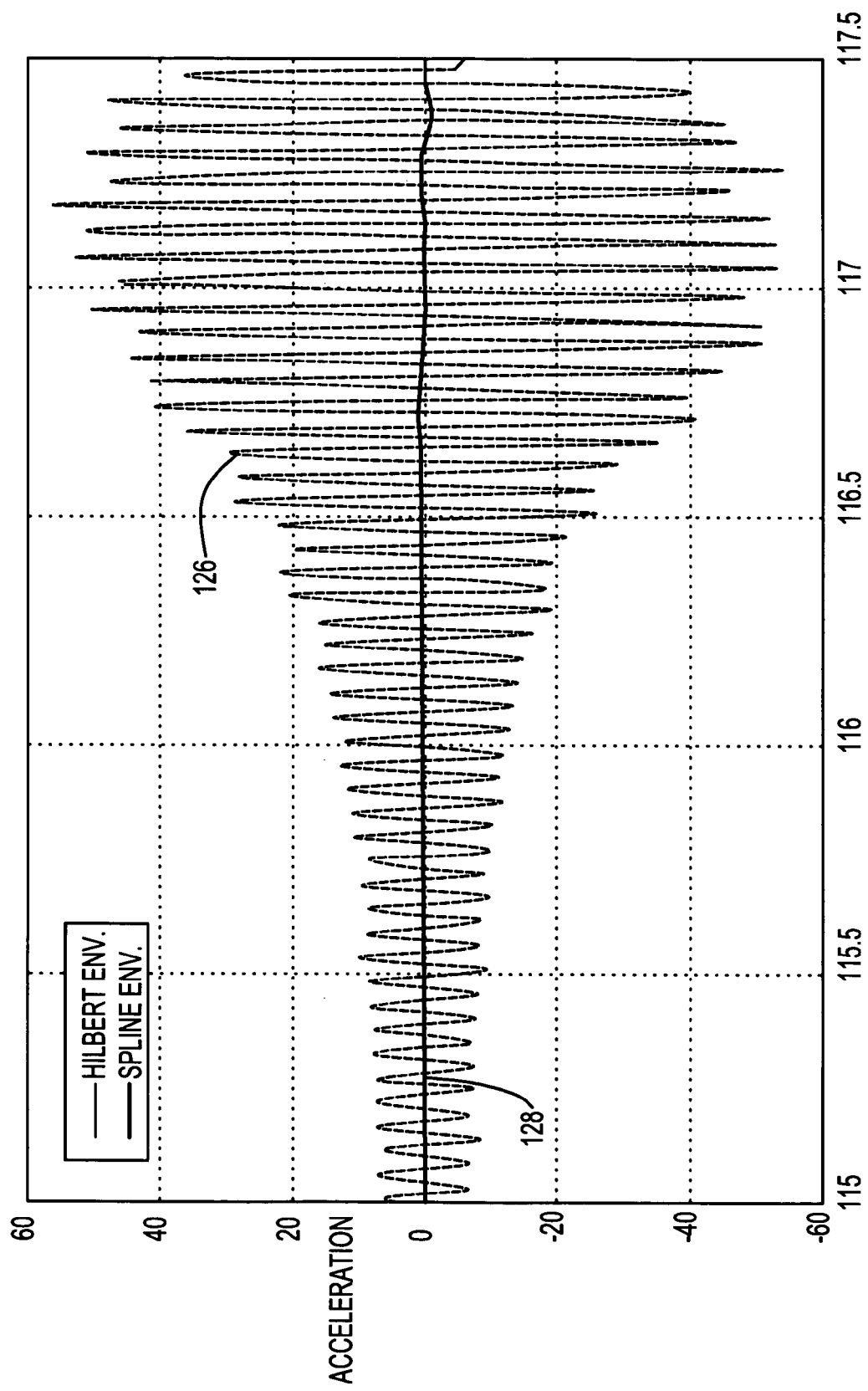
FIG. 5 shows a comparison of the Hilbert transform envelope derivative and the spline envelope derivative.

FIG. 5 shows a comparison of the Hilbert transform envelope derivative 126 and the spline envelope derivative 128 from step 110 of FIG. 1. A derivative equivalent may be determined (within a constant factor of 1/Δt) by taking successive differences of each point. As can be seen from this example, the Hilbert transform envelope derivative 126 is somewhat sinusoidal with both positive and negative values with each period. It should be noted that these positive and negative swings are artifacts of the Hilbert transform and have nothing to do with the stability of the particular structure. By contrast, the spline derivative 128 ripple is at least 2 orders of magnitude smaller than the Hilbert transform envelope derivative 126.

In step 112, the instability spectrum (or by the complement, the stability spectrum) preferably is generated for the intrinsic mode functions by separating positive and negative results. As noted hereinabove, the instability spectrum may be generated using ISSpec. ISSpec is one suitable example of how the instability spectrum may be generated, e.g., using the Signal Processing Toolbox from The MathWorks®, Inc. In particular, ISSpec requires a number of control inputs, as well as the data results from previous steps to pre-filter the data, if selected, and to smooth the resulting spectrum over a selected number (n) of time points. The N IMF components may be provided in an M by N dimension matrix, with each column corresponding to an IMF, and each row corresponding to one of M different time points. Pre-filtering can be modified or removed by changing the appropriate lines in ISSpec. An out-put frequency bin number may be pre-selected with a default value set at 20. Minimum and maximum output frequency values may be selected in Hz with the default minimum at zero, and the default maximum set at infinite. An initial time may be selected, and is defaulted to zero seconds. A final time may be selected with a default final time of 100 seconds. As all differentiation operations necessarily generate noise, all data preferably are pre-filtered and the resulting spectrum is smoothed over a number of time points, D. The time segment over which to smooth the resulting Hilbert transformed spectral values, may be set with the default at 3 points. An amplitude cutoff ratio, per, may be selected, e.g., per may be defaulted to 1%=0.01, and subsequently selected at 0.05 for 5%. Below the amplitude cutoff ratio, derivative amplitude is set to zero (ignored). The output axis scale may be pre-selected to generate the output frequency vector in linear or log coordinates for display on a linear-linear or log-linear graph, with the default linear. If desired, HilbertE, a special program with end effects suppressed, but not eliminated, may be selected to pre-treat the data to minimize the end effects. ISSpec outputs include a matrix of instantaneous frequencies and the magnitude of the instability factor obtained from Hilbert transform, minimum and maximum instantaneous frequencies, as well as corresponding time and frequency points. Results can be plotted using any suitable toolbox built on Matlab® platform.

Figure 6A:
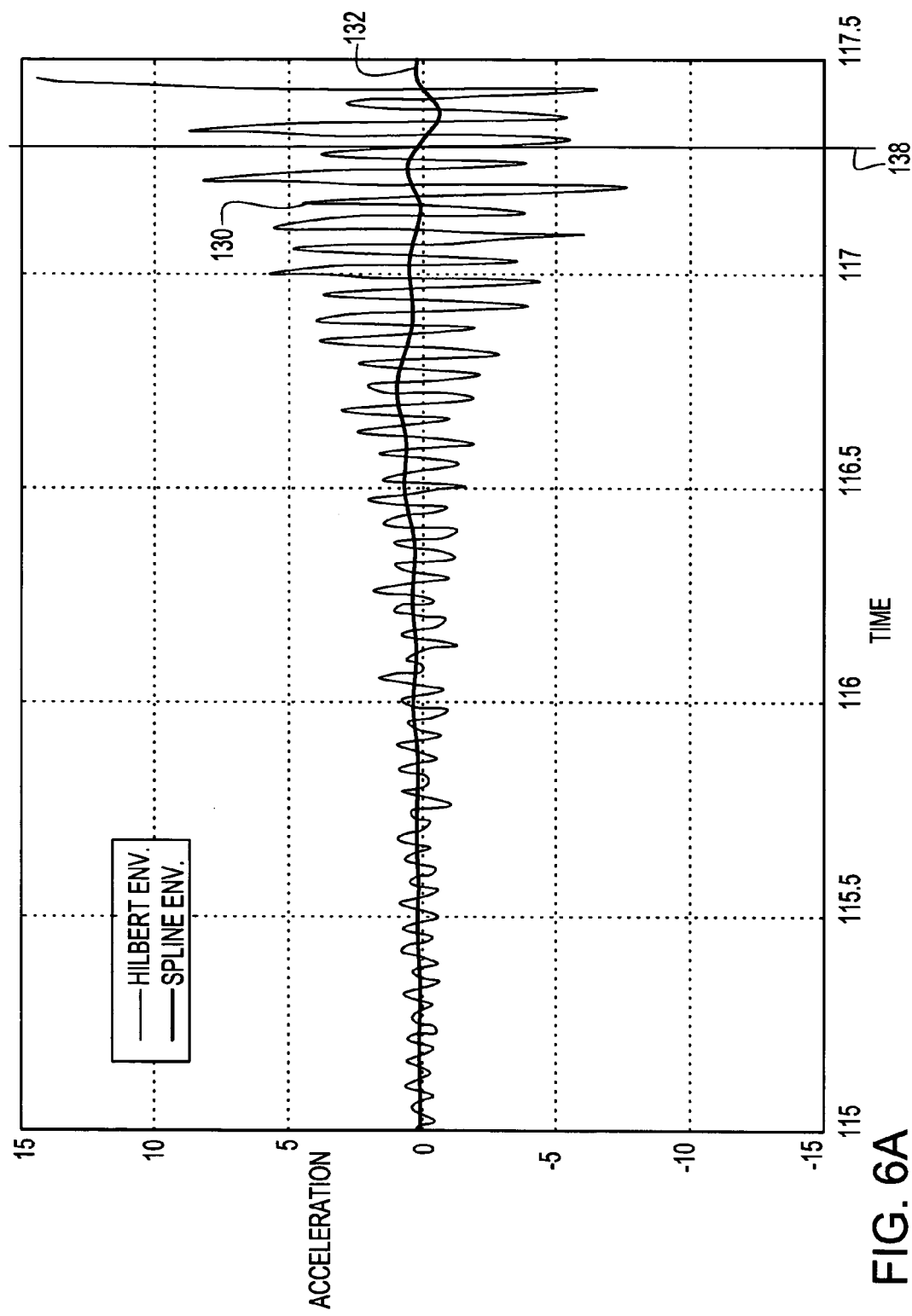
FIGS. 6A-B show examples of the effects of smoothing on determining the stability indicator in step, comparing the Hilbert transform derivative and spline envelope of a 5-point smoothing mean and a 21-point smoothing mean.
Figure 6B:
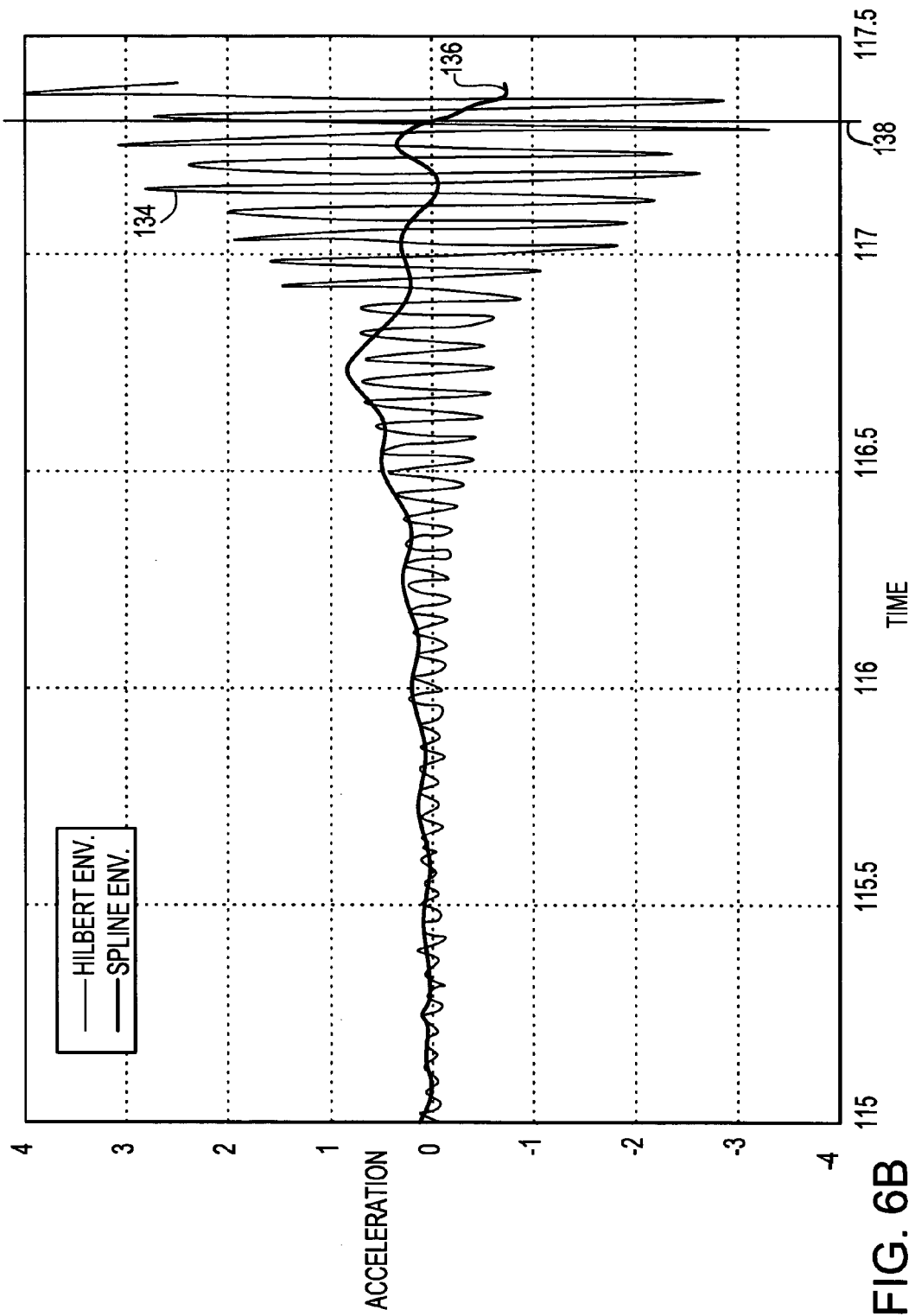
Figure 7A:
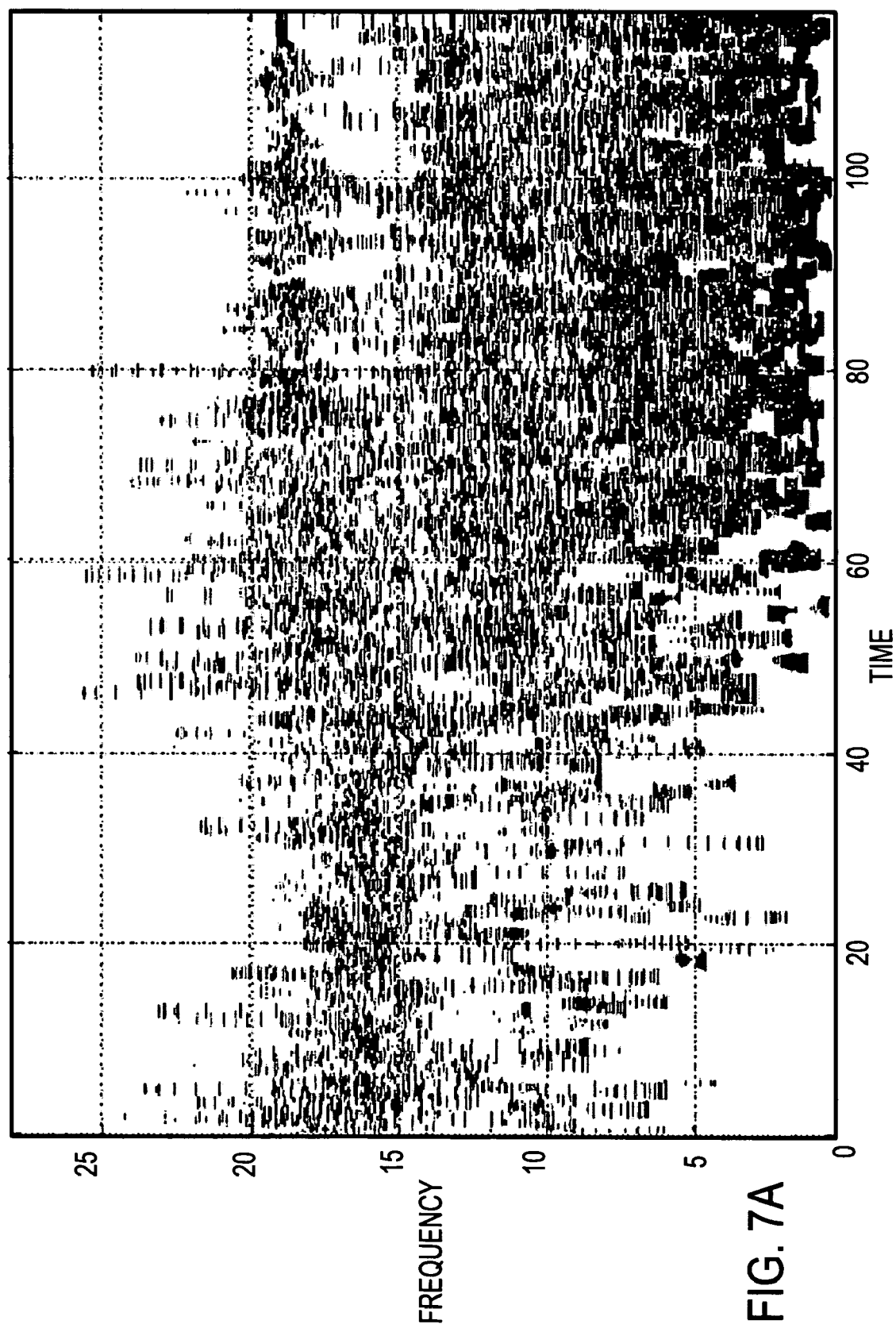
FIGS. 7A-D show an example of 10-point averaging to smooth the Hilbert Stability spectrum from ISSpec with cutoff values at 0.001, 0.005, 0.01, and 0.1 with both positive and negative damping factors.
Figure 7B:
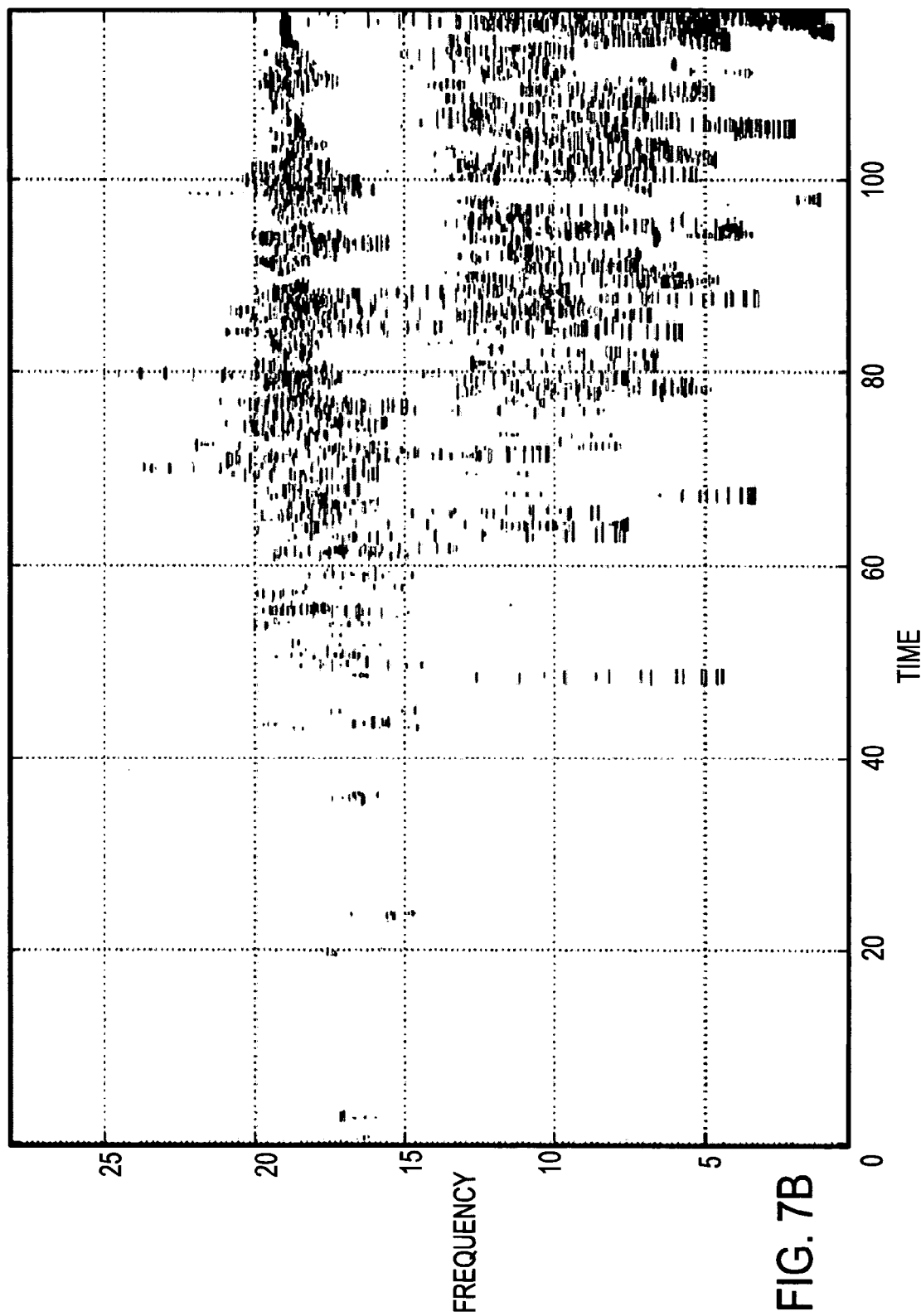
Figure 7C:
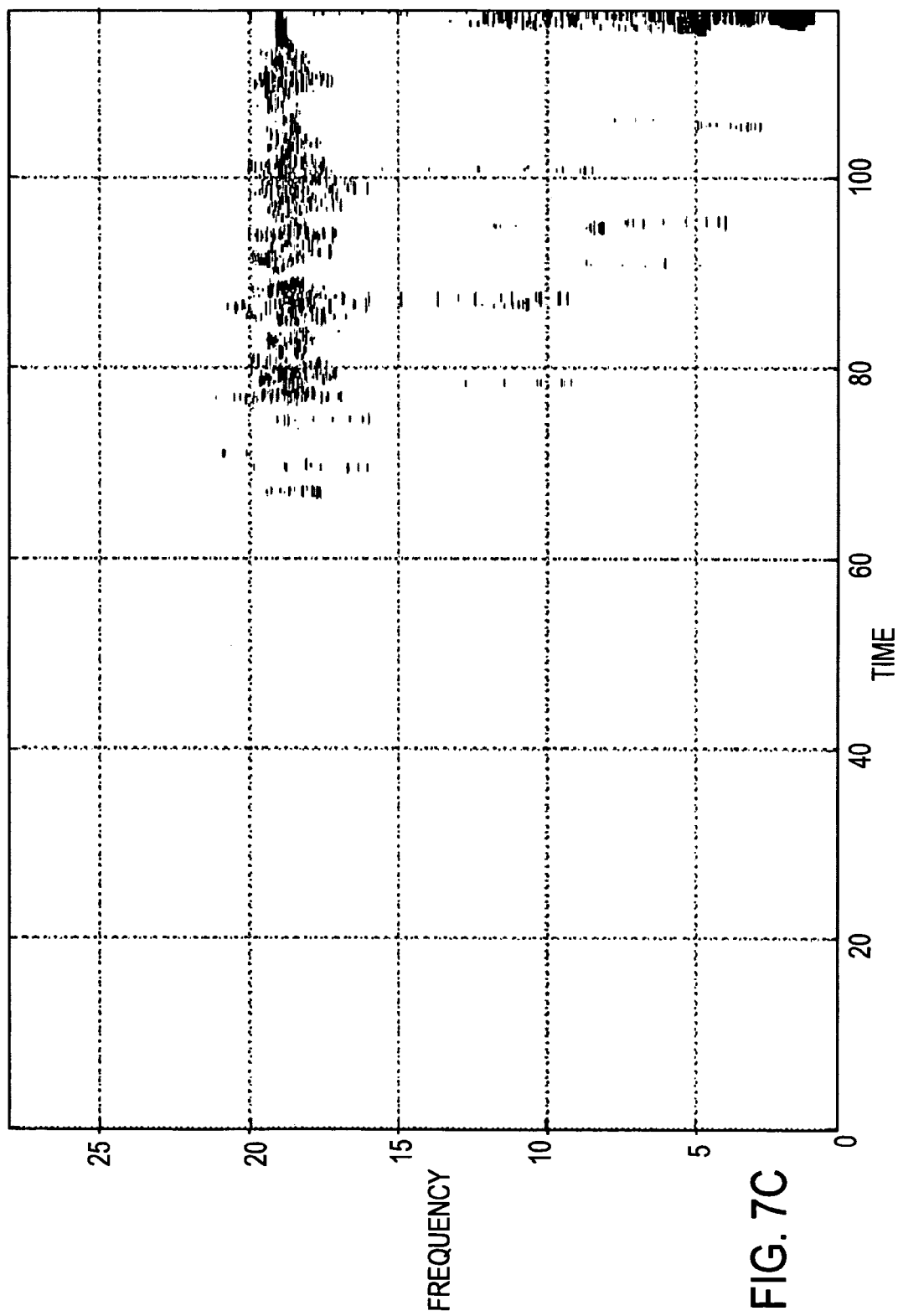
Figure 7D:
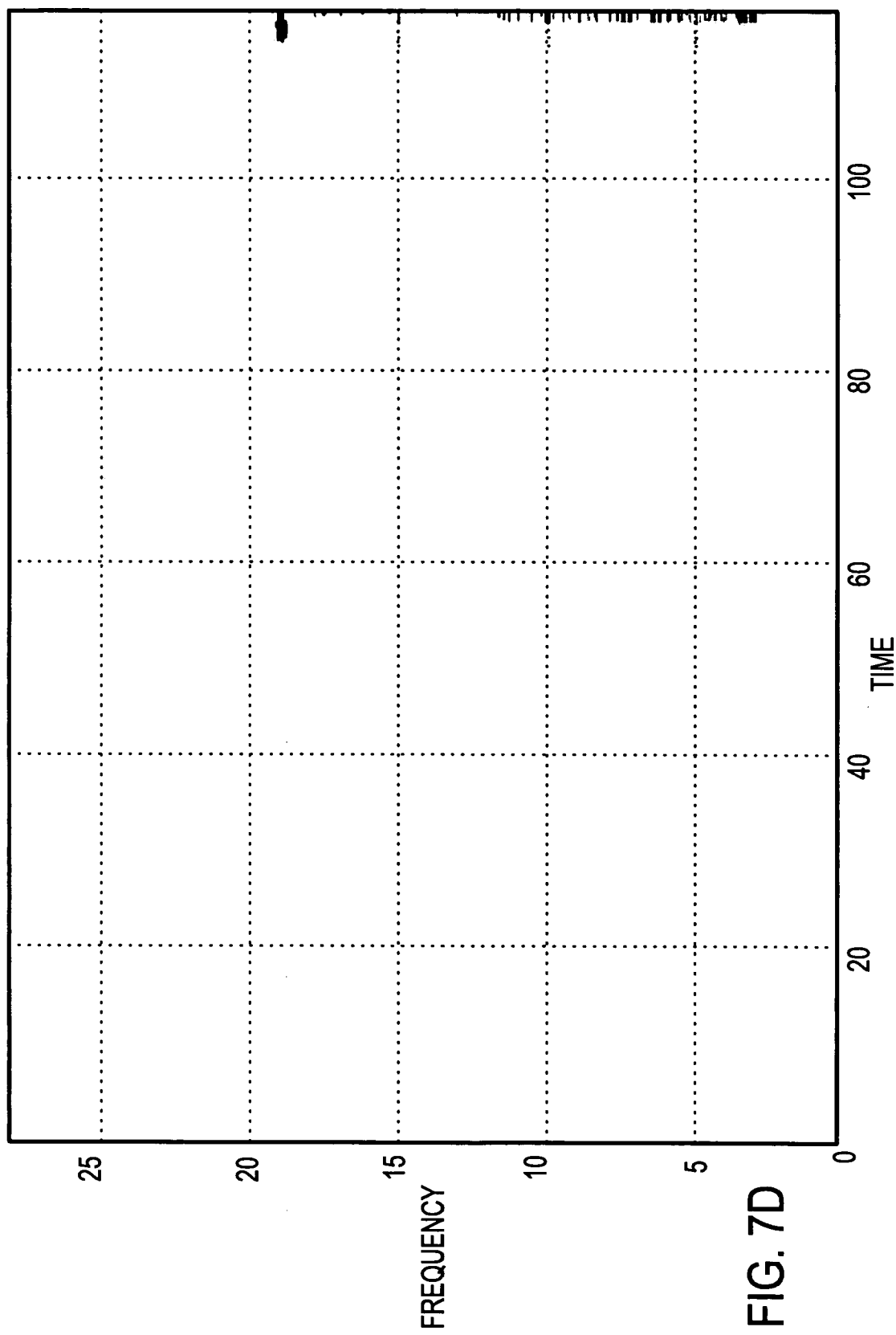

FIGS. 6A-B show examples of the effects of smoothing on determining the stability indicator in step 114, comparing a 5-point smoothing mean for the Hilbert transform derivative 130 and the spline envelope derivative 132, and comparing a 21-point smoothing mean for the Hilbert transform derivative 134 and the spline envelope derivative 136. While the magnitude for the Hilbert transform derivatives 130, 134 decreases somewhat as the smoothing window widens, the sign of the derivative continues to switch. So, additional smoothing does not provide decipherable information from the Hilbert transform derivative about the vibrations. By contrast, the spline envelope derivative 132, 136 only fluctuates somewhat either in the positive direction or negative direction. However, the spline envelope derivative 132, 136 exhibits a single identifiable minimum and maximum that provides useful information for determining whether vibrations are from stable or unstable conditions, i.e., from changes in material stiffness. In particular, the spline envelope derivative 132, 136 is consistently positive (stable vibrations) prior to 138 (i.e., at 117.3 seconds). However, the spline envelope derivative 132, 136 begins changing sign to indicate a switch between stable (positive) and unstable (negative) vibrations. Thus, in step 114 the sign of spline envelope derivative 132, 136 may be used as a stability indicator at 138. Further, this stability indicator is available without determining a moving mean from the positive and negative derivative, which would obfuscate this difference.

FIGS. 7A-D show an example of 10-point averaging to smooth the Hilbert stability spectrum from ISSpec with amplitude ratio cutoff values (per) at 0.001, 0.005, 0.01, and 0.1 with both positive and negative damping factors. Since the damping factor is defined by the ratio of the derivative of the amplitude to the amplitude, the amplitude derivative can dominate whenever the signal amplitude is low but changing. During such low amplitude periods, the signal energy density, most likely, is too low to be of any dynamic consequence. Thus, the amplitude ratio cutoff causes those periods to be ignored. As a result, the filtered results (for amplitude ratio cutoff, also called damping factor marginal) reflect only vibrations with sufficient energy density. From these figures, it is clear that selection of the cutoff value dramatically affects the results. With the cutoff set to 0.001 in FIG. 7A, almost nothing is removed, and the damping factor is dominated by very small amplitude vibrations at low frequencies. In particular, the information from small amplitude vibrations can swamp any more critical information at the larger signal amplitudes. As this example shows, by progressively raising the amplitude ratio cutoff criterion from 0.005 in FIG. 7B to 0.01 in FIG. 7C, insignificant components that contain negligible energy are filtered out. On the other hand, with the amplitude ratio cutoff too high, e.g., at 0.1 in FIG. 7D, valid information is obliterated and the result provides little useful information, if any.

Figure 8A:
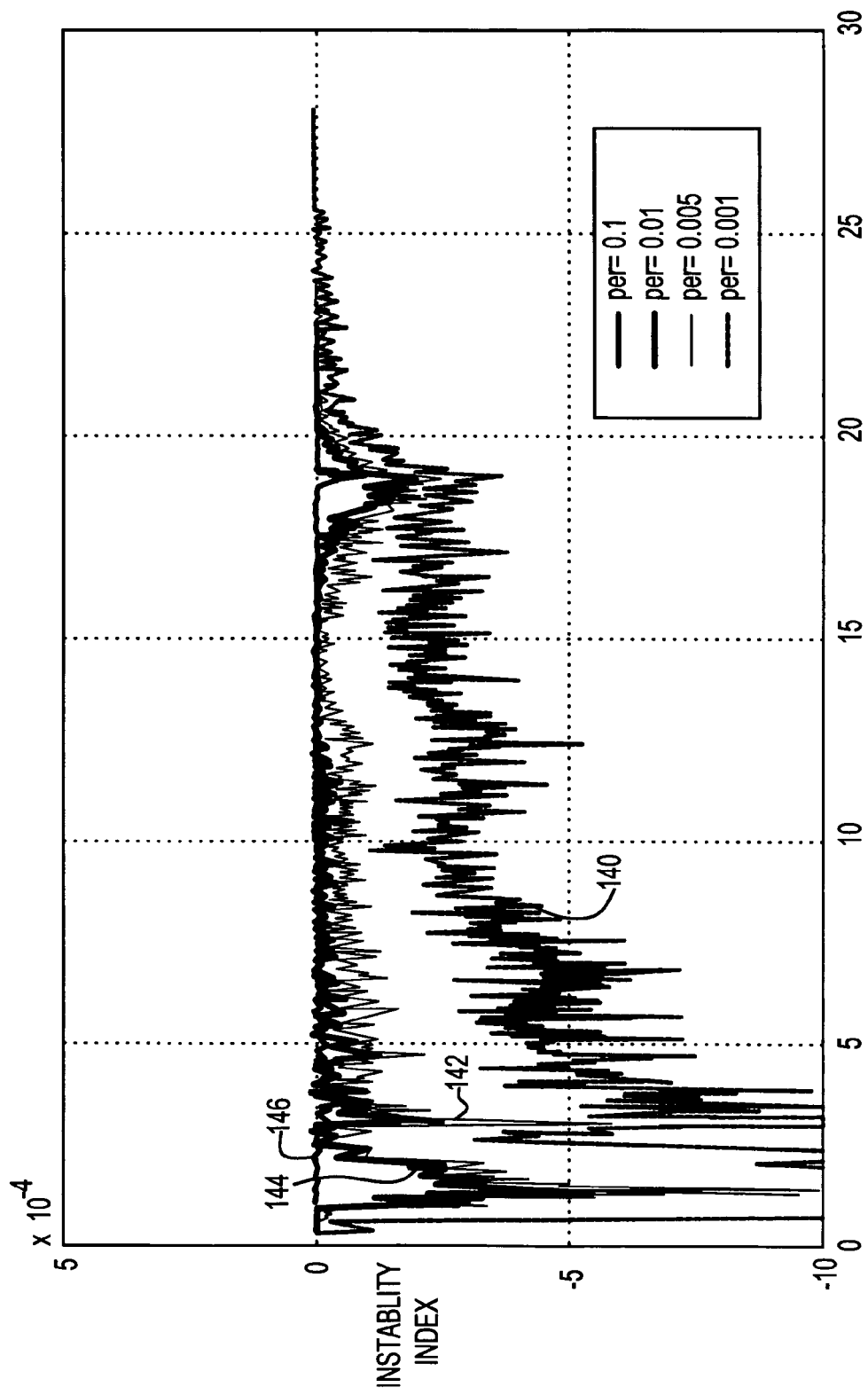
Figure 9A:
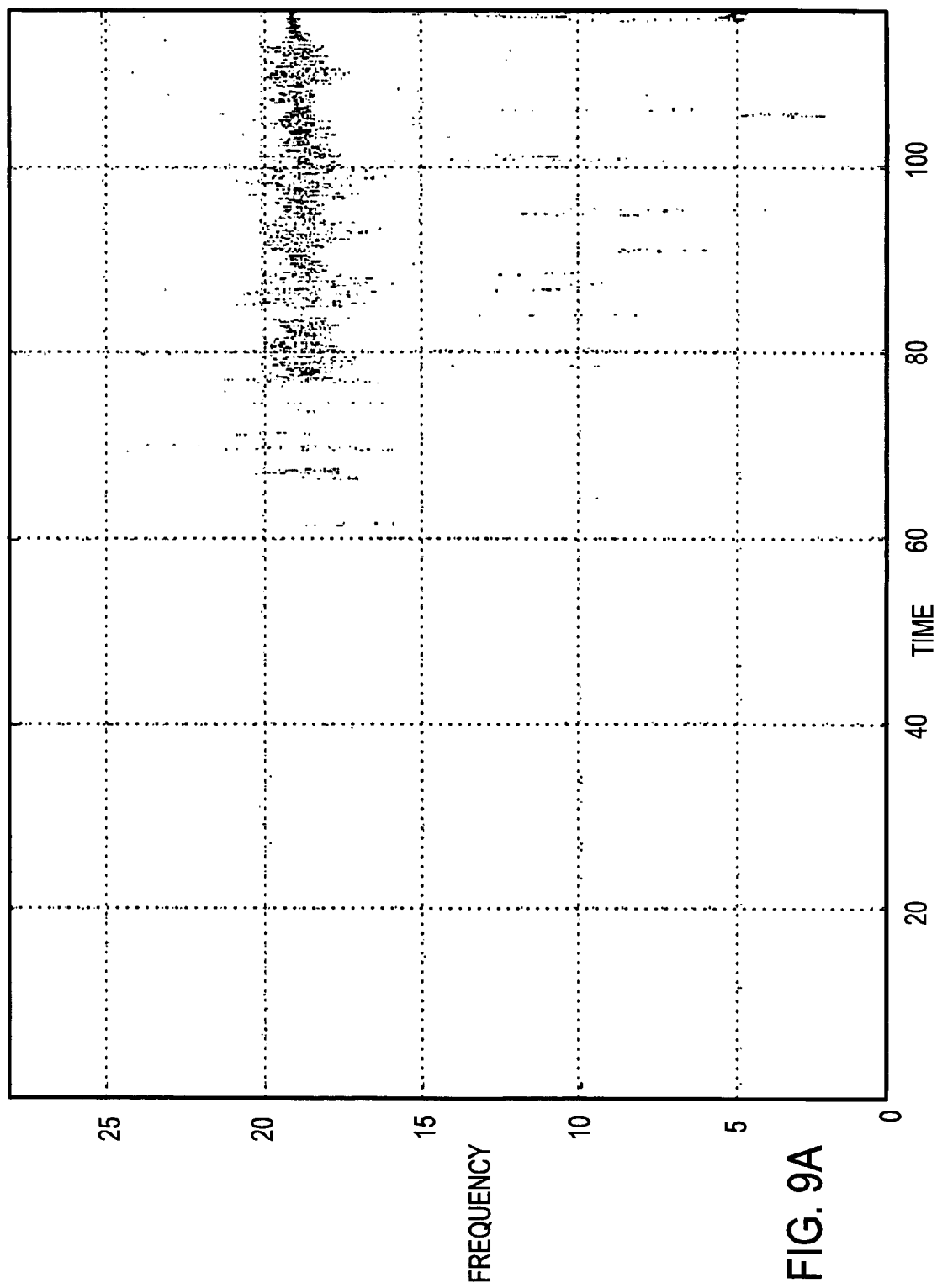
FIGS. 9A-E show an example comparing the smoothing length, D in 3, 5, 10, 15 and 20 point averaging, respectively, to smooth the Hilbert Stability spectrum from ISSpec with cutoff value at 0.01 for both positive and negative damping factors.
Figure 9B:
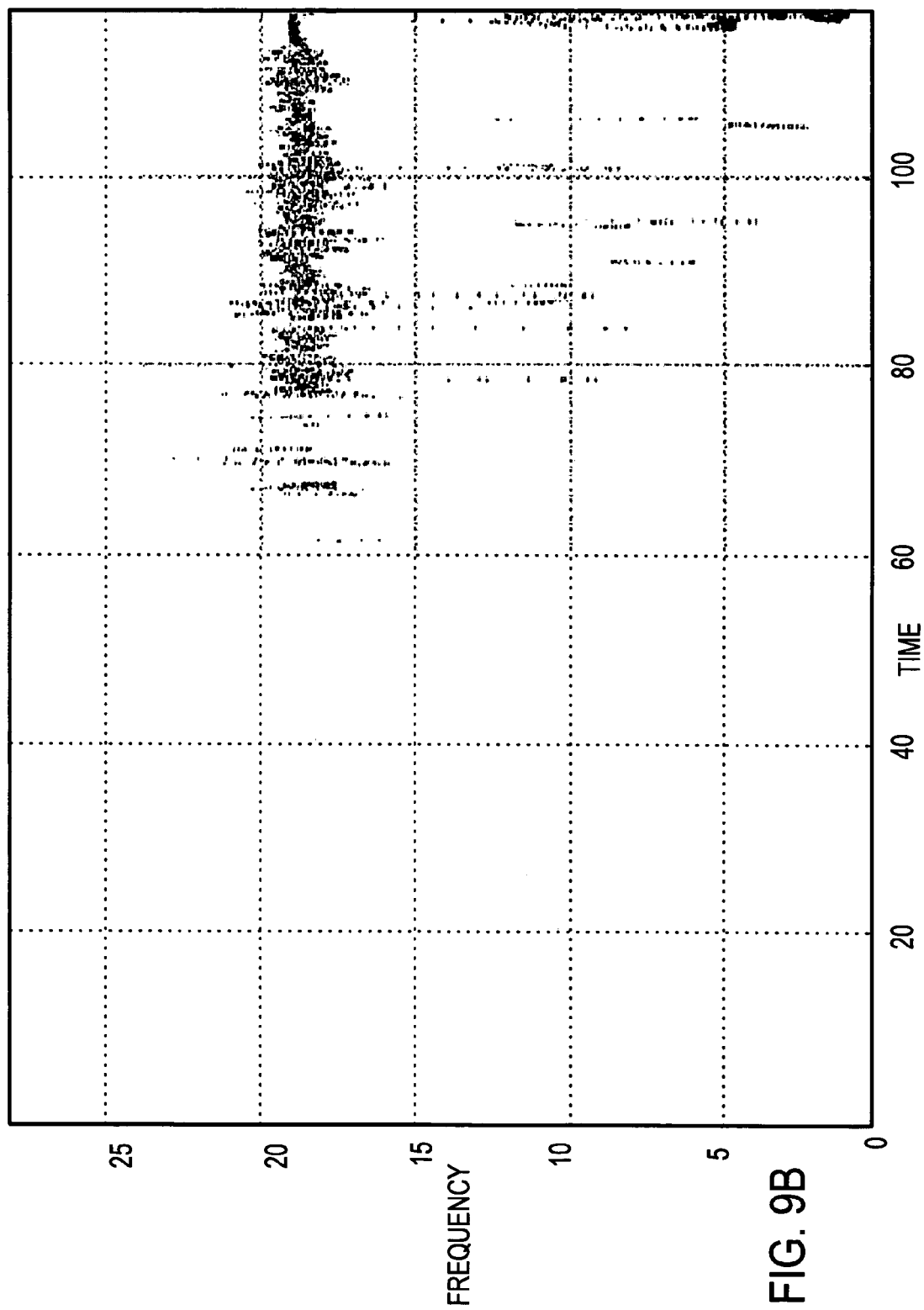
Figure 9C:
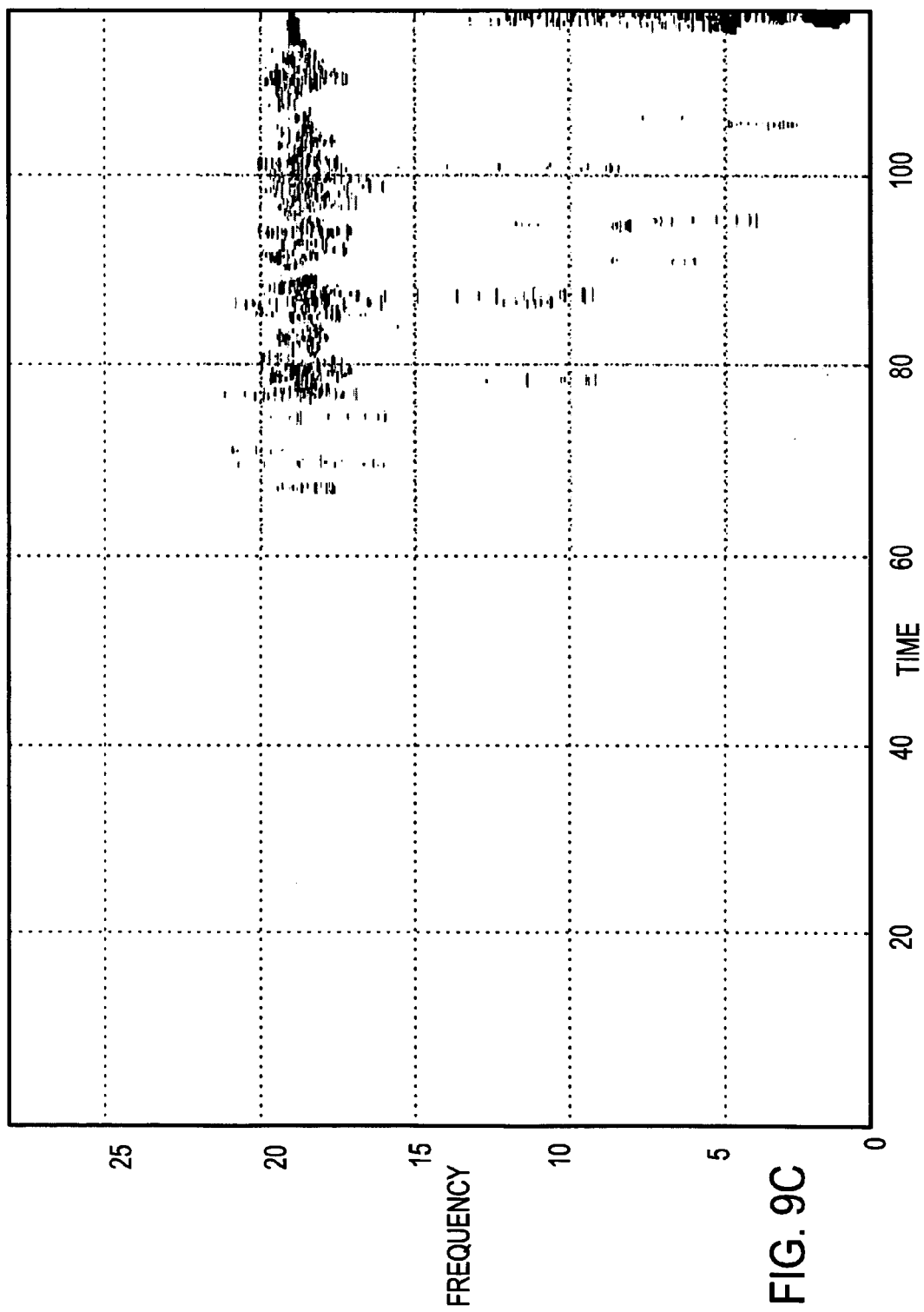
Figure 9D:
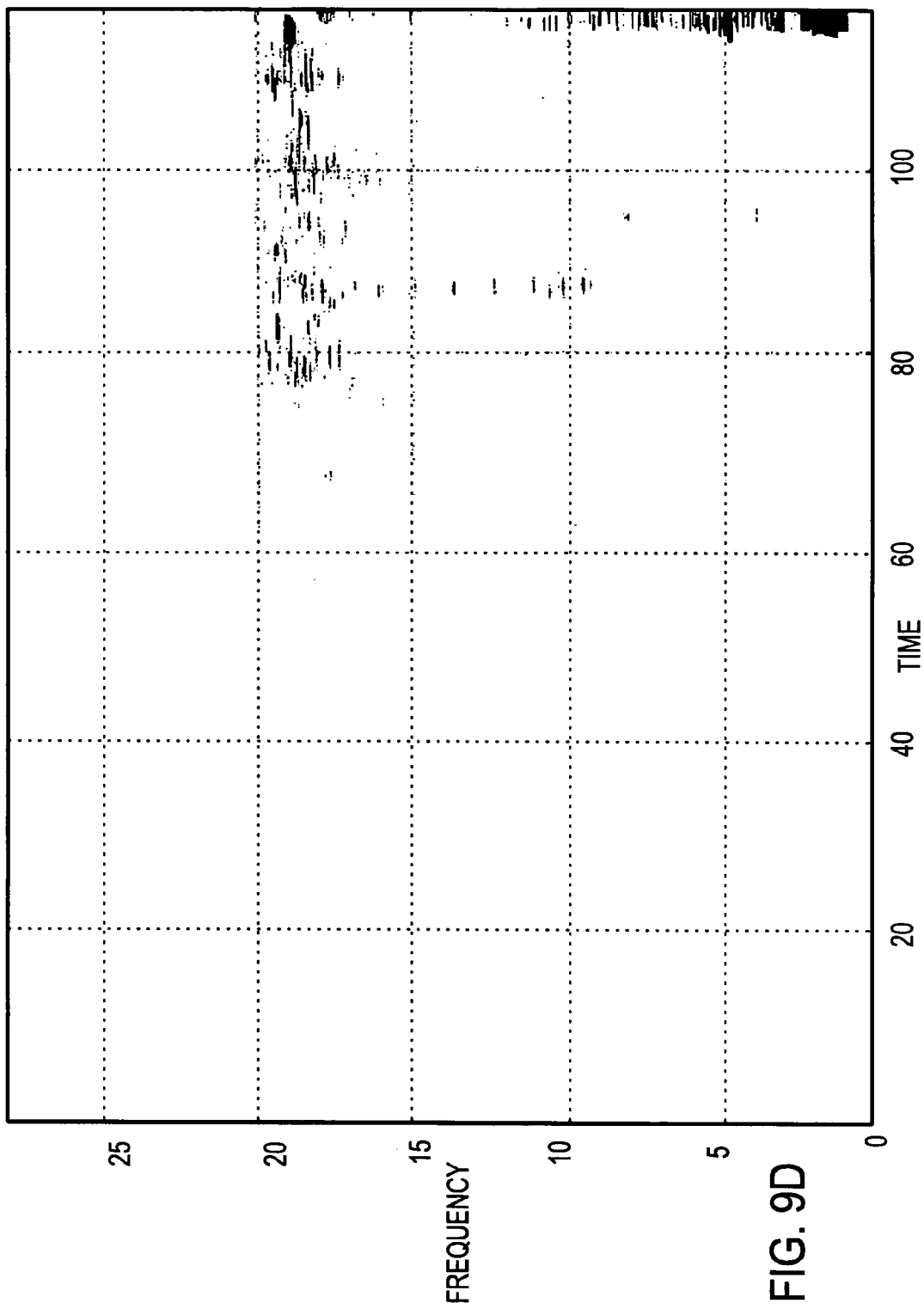
Figure 9E:
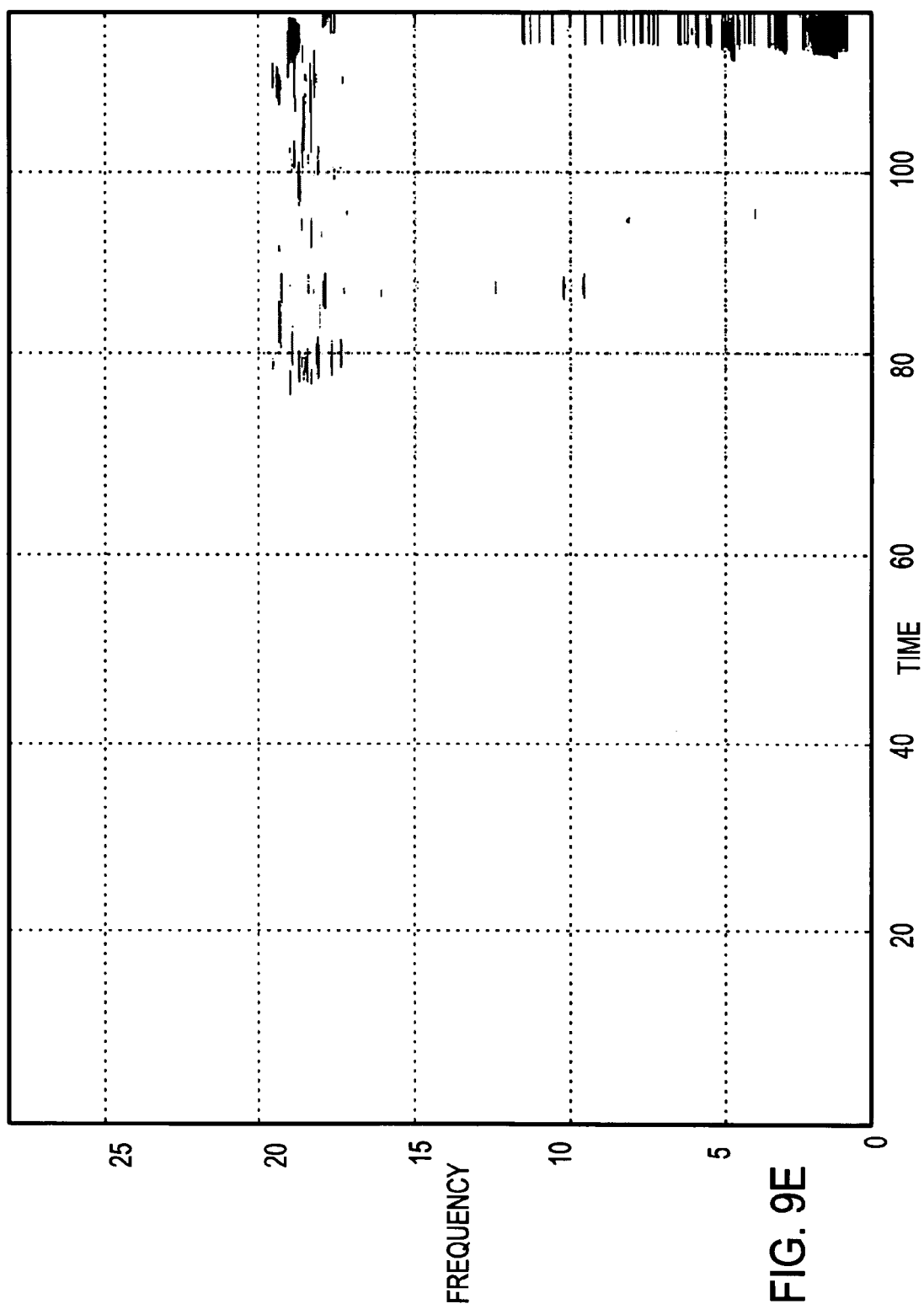

FIGS. 8A-B show a summary view example of the effects of the amplitude ratio cutoff selection in FIGS. 7A-D. FIG. 8A shows an example of the damping factor marginal value 140, 142, 144, 146 plotted as a function of frequency for the various amplitude ratio cutoff values, i.e., 0.001, 0.005, 0.01 and 0.1, respectively. It is apparent that the derivative for the low amplitude signal dominates the damping factor marginal value 140 at low frequency, nearly totally obfuscating results of interest. However, as the cutoff limit increases, e.g., to 0.005, the damping factor marginal value 142 begins to stabilize with a very small difference between the damping factor marginal values 142 and 144. Again, when the amplitude ratio cutoff is selected too high, e.g., at 0.1, the damping factor marginal values 142 are nearly totally eliminated, removing much of interest. Similarly, FIG. 8B compares damping factor marginal value 150, 152, 154, 156 plotted as functions of time for the various cutoff limits, 0.001, 0.005, 0.01 and 0.1, respectively. Here, it is apparent that with the amplitude ratio cutoff selected too small 150 noise overwhelms negative damping throughout the test, while selecting it too large 156 removes most useful information, at least prior to the onset of the drastic failure (138 in FIGS. 6A-B). However, with proper amplitude ratio cutoff selection at or just prior to failure 138, each of the lower cutoff limits produce discernable damping factor indications, 150, 152, 154.

FIGS. 9A-E show an example of results from ISSpec with amplitude ratio cutoff value at 0.01 for both positive and negative damping factors and comparing the smoothing length, D in 3, 5, 10, 15 and 20 point averaging, respectively, to smooth the Hilbert stability spectrum. As can be seen from this example, with minimal 3 point smoothing in FIG. 9A, the data appears almost random. With the 15 and 20 point smoothing examples of FIGS. 9D and E, the data blur to the point that too much smoothing also obliterates temporal variations. However, the moderate 5 and 10 point smoothing examples of FIGS. 9B and C provide very, crisp clear results for structural vibration analysis.

Figure 10A:
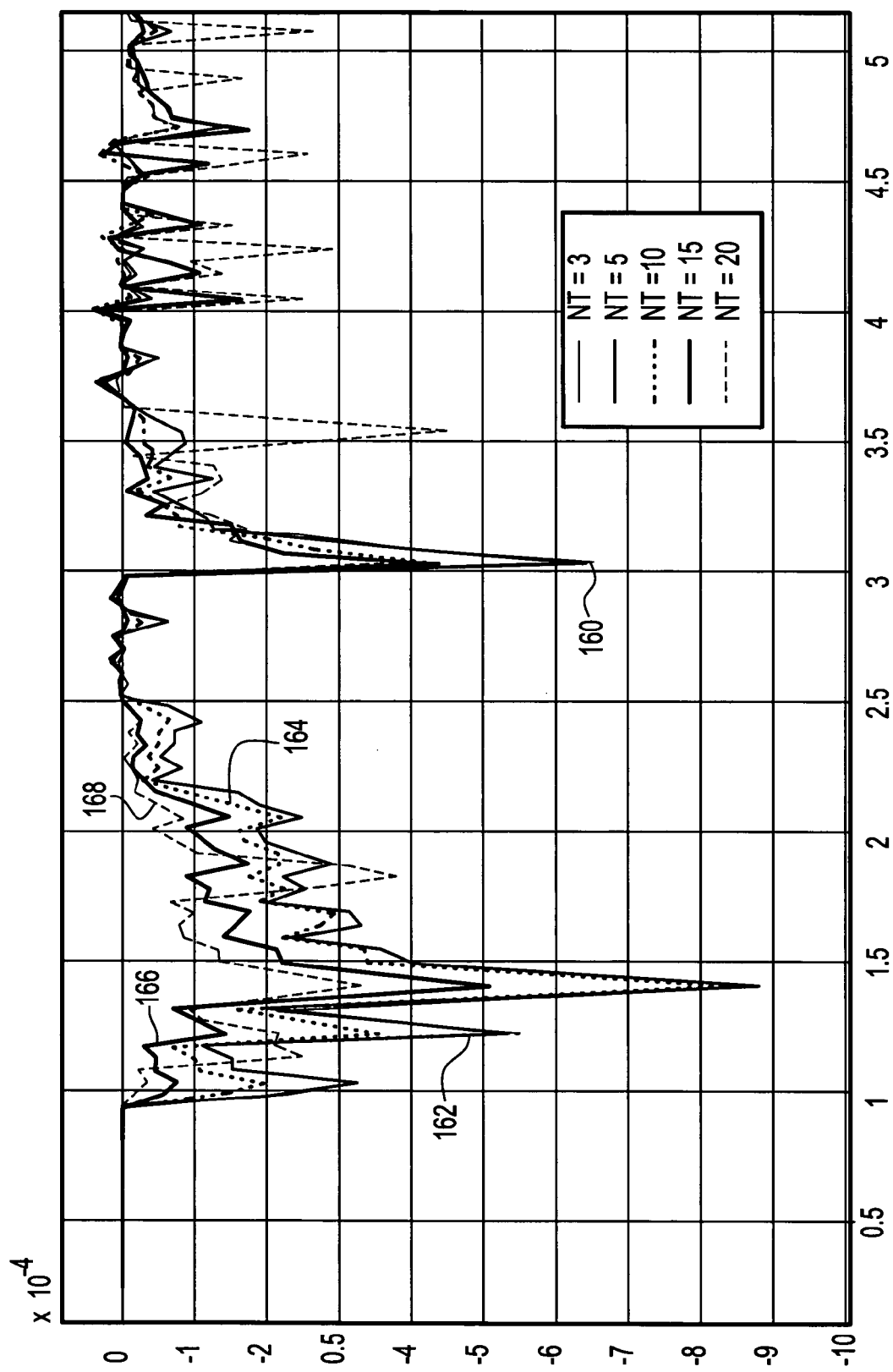
FIGS. 10A-B show a summary view example of the effects of the smoothing length selection.
Figure 10B:
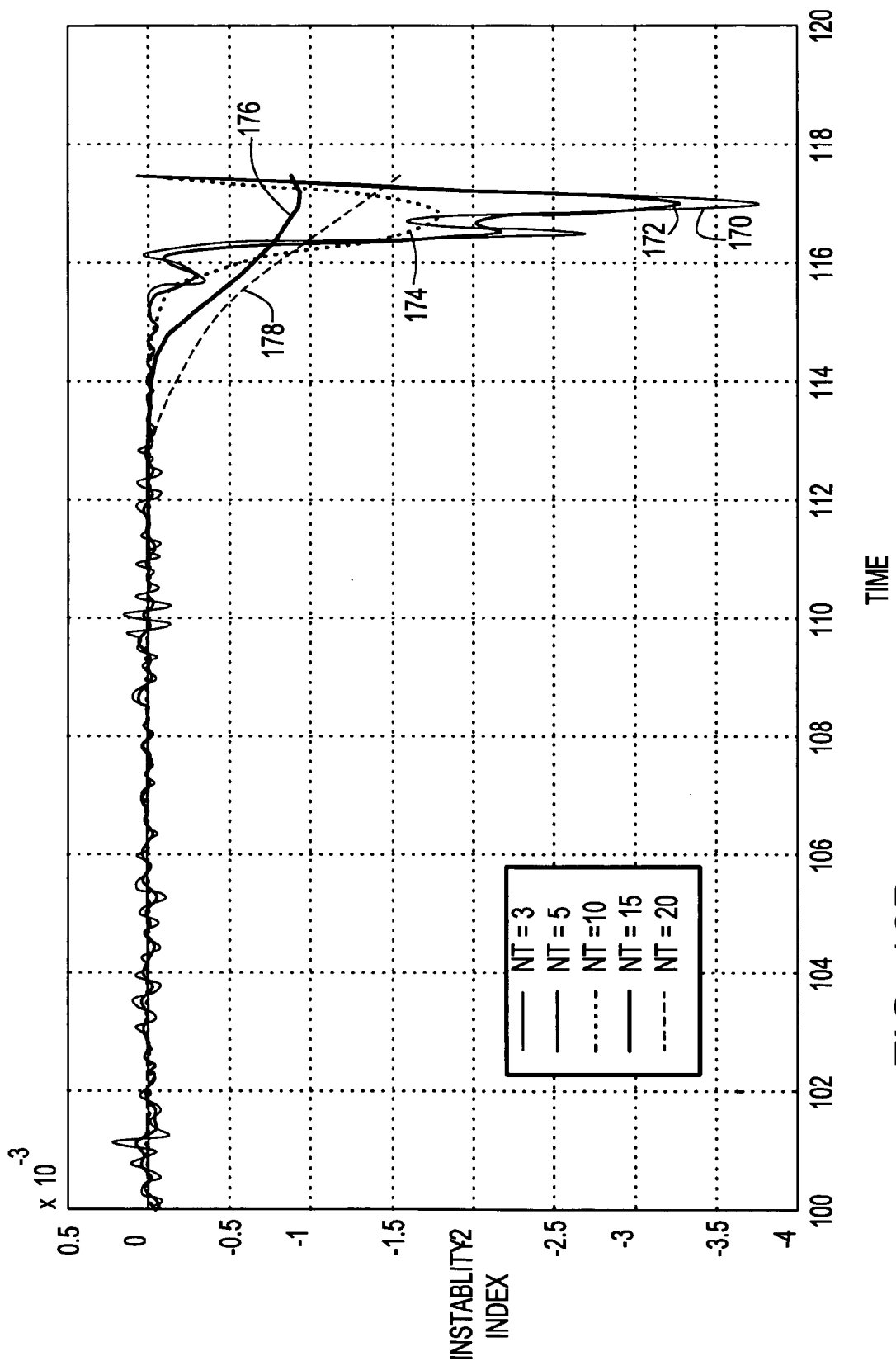

FIGS. 10A-B show a summary view example of the effects of the smoothing length selection in FIGS. 9A-E. In particular, FIG. 10A compares the effect of smoothing length on stability factor 160, 162, 164, 166, 168 with respect to frequency at smoothing lengths of 3, 5, 10, 15 and 20, respectively. Similarly, FIG. 10B compares the smoothing length on stability factor 170, 172, 174, 176, 178 with respect to time at the same smoothing lengths of 3, 5, 10, 15 and 20, respectively. The effect of smoothing is clearer in the temporal marginal presentation of FIG. 10B, where the smoothing eliminates variations to the point where the smoothed result is not particularly useful for D greater than 10.

Thus, it can be seen that differentiation generates noise in the results, that may be mitigated by pre-filtering the data and smoothing, e.g., over D time points. ISSpec allows pre-selecting or skipping pre-filtering, e.g., by selectively modifying appropriate ISSpec lines. Thus, the user can specify the resolution of the result by selecting the number of frequency bins, and the maximum and minimum values of the frequency range. The results can also be presented either in linear or logarithmic frequency axis scales. Optionally, the data can be pre-treated to minimize Hilbert transformation end effects.

Figure 11B:
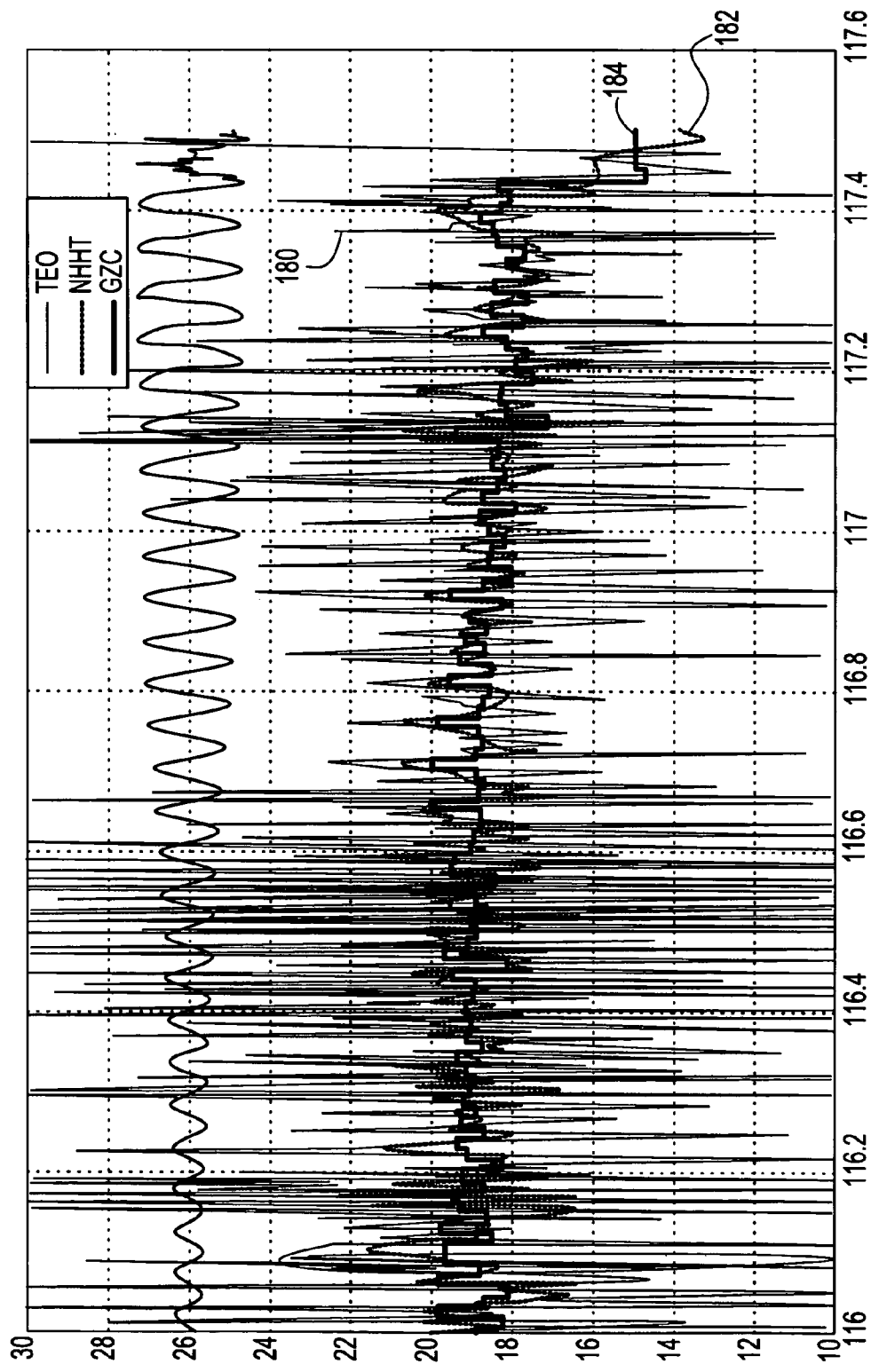

FIGS. 11A-B, show a comparison of instantaneous frequency extracted using the TEO 180, NHHT 182 and GZC 184. Extracted instantaneous frequency changes 180, 182, 184, in the vibration data are shown as a function of time with the entire test period displayed in FIG. 11A and an expanded view of the segment of interest near the drastic failure event at 117.5. While it is apparent from FIG. 11A that the test airfoil experiences nonlinear vibration throughout the test, the corresponding instability is not overwhelming. Thus, it is necessary to determine when the non-linearity indicates that material stiffness is changing, and so, a failure is imminent. It is also apparent that the TEO 180 provides, a sharper identification of the presence of nonlinearities. Accordingly, the nonlinear indicator is taken as the time when the instantaneous frequency becomes drastically different from the values determined by these three approaches. So, for some given computational instability, the instantaneous frequency may be selected as that time when the instantaneous frequency from TEO 180 is more than a factor of two larger than the instantaneous frequency from NHHT 182 or GZC 184.

Advantageously, dampening vibrations are distinguished from de-stabilizing vibrations or vibrations that indicate instability such that changes in material stiffness may be easily identified according to the present invention. Further, the present invention provides consistently reliable dampening predictor indications, especially for understanding vibrational instability in modem airborne structures. Thus, the present invention is especially helpful in analyzing flexible, light-weight structures that are made of advanced materials, e.g., the aero-elasticity of state of the art airborne structures. Thus, using an embodiment of the present invention, one can predict stability margins, even for these aero-elastic structures, and especially, for understanding structural dynamic instabilities such as flutter. Thus, one can determine the onset of instability in aero-elastic structures from the flight data to provide valid flight flutter prediction information and improve flight safety.

While the invention has been described in terms of exemplary embodiments, those skilled in the art will recognize that the invention can be practiced with modification within the spirit and scope of the appended claims. It is intended that all such variations and modifications fall within the scope of the appended claims.

What is claimed is:

1. A method of analyzing vibrations, said method comprising the steps of:
   collecting vibration data;
   extracting intrinsic mode functions (IMFs) indicative of intrinsic oscillatory modes in said collected vibration data satisfying at least one of the conditions:
   a) the number of extrema and number of minima crossings differ by at most a first predetermined value and
   b) the mean value of an upper envelope maxima and lower envelope minima approaches a second predetermined value;
   generating a stability spectrum for said vibration data from said IMFs by classifying said vibration data into positive and negative results and separating said positive and negative results;
   generating a non-linearity indicator for said stability spectrum; and,
   displaying non-linearity indicator in said stability spectrum, said non-linearity indicator indicating a transition from stability to instability.

2. A method of analyzing vibrations as in claim 1, wherein the step of extracting IMFs comprises applying a Hilbert Huang Transform to said collected vibration data.

3. A method of analyzing vibrations as in claim 2, wherein the extracted IMFs have the form $$x(t) = \sum_{j=1}^{n} c_j(t) + r_n;$$

wherein $c_j(t)$ is the $j^{th}$ IMF component of the IMF and $r_n$ is the residual value.

4. A method of analyzing vibrations as in claim 1, wherein the step of generating the stability spectrum comprises:
   identifying one of said extracted IMFs as most energetic; and
   calculating a spline fitting the envelope of said identified IMF.

5. A method of analyzing vibrations as in claim 4, wherein the vibration frequency of each IMF is taken as an indication of energy.

6. A method of analyzing vibrations as in claim 4, wherein the step of identifying said one extracted IMF as mast energetic, selects the IMF with the greatest vibration frequency.

7. A method of analyzing vibrations as in claim 6, wherein said non-linearity indicator occurs when said derivative of said spline changes sign.

8. A method of analyzing vibrations as in claim 7, wherein stability is indicated by a positive said derivative of said spline and instability is indicated by a negative said derivative.

9. A method of analyzing vibrations as in claim 4, wherein the step of generating the stability spectrum further comprises taking a derivative of said spline.

10. A method of analyzing vibrations as in claim 9, wherein the step of generating the stability spectrum comprises setting the derivative of said splint to zero whenever the ratio of the spline amplitude to a corresponding derivative value is below a threshold.

11. A method of analyzing vibrations as in claim 10, wherein the threshold is between about 0.5 and about —10%.

12. A method of analyzing vibrations as in claim 10, wherein the threshold is about 1%.

13. A method of analyzing vibrations as in claim 9, wherein the step of generating the stability spectrum further comprises smoothing said spline and said derivative of said spline.

14. A method of analyzing vibrations as in claim 13, wherein the step of smoothing comprises taking a running average.

15. A method of analyzing vibrations as in claim 14, wherein the running average is a 5 to 10 point running average.

16. A computer program product for analyzing structural vibrations, said computer program product comprising a computer usable medium having computer readable program code comprising:
   an extraction module for extracting intrinsic mode functions (IMFs) from vibration data, said IMFs being indicative of intrinsic oscillatory modes in said vibration data satisfying at least one of the conditions:
   a) the number of extrema and number of minima crossings differ by at most a first predetermined value and
   b) the mean value of an upper envelope maxima and lower envelope minima approaches a second predetermined value;
   a stability module for generating a stability spectrum from extracted said IMFs by classifying said vibration data into positive and negative results and separating said positive and negative results;
   generating a non-linearity indicator for said stability spectrum; and,
   a first identification module for identifying said non-linearity indicator in said stability spectrum, said non-linearity indicator indicating a transition from stability to instability.

17. A computer program product for analyzing structural vibrations as in claim 16, wherein the extraction module comprises an Empirical Mode Decomposition (EMD) module.

18. A computer program product for analyzing structural vibrations as in claim 16, wherein said EMD module comprises a computer readable program code for applying a Hilbert Huang Transform to said vibration data.

19. A computer program product for analyzing structural vibrations as in claim 16, wherein the extracted IMFs have the form $$x(t) = \sum_{j=1}^{n} c_j(t) + r_n;$$

wherein $c_j(t)$ is the $j^{th}$ IMF component of the IMF and $r_n$ is the residual value.

20. A computer program product for analyzing structural vibrations as in claim 16, wherein the stability module comprises:
   a second identification module for identifying a most energetic IMF; and
   a spline fitting module for fitting a spline to IMF envelopes.

21. A computer program product for analyzing structural vibrations as in claim 20, wherein the stability spectrum further comprises a computer readable program code for taking the derivative of an IMF envelope.

22. A computer program product for analyzing structural vibrations as in claim 21, wherein the stability module further comprises a computer readable program code for selectively ignoring said derivative responsive to an amplitude ratio between an envelope and an envelope derivative being below a threshold.

23. A computer program product for analyzing structural vibrations as in claim 21, wherein the threshold is between about 0.5 and about 10%.

24. A computer program product for analyzing structural vibrations as in claim 21, wherein the threshold is about 1%.

25. A computer program product for analyzing structural vibrations as in claim 20, wherein the first identification comprises computer readable program code for identifying when said envelope derivative changes sign.

26. A computer program product for analyzing structural vibrations as in claim 16, wherein the stability module further comprises a smoothing module for smoothing an envelope sad an envelope derivative.

27. A computer program product for analyzing structural vibrations as in claim 26, wherein the smoothing module comprises a computer readable program code for taking a running average.

28. A system for analyzing structural vibrations comprising:
 a storage device for storing vibration data;
 a sifting device for extracting intrinsic mode functions (IMFs) indicative of intrinsic oscillatory modes from stored said vibration data satisfying at least one of the conditions:
 a) the number of extrema and number of minima crossings differ by a first predetermined value and
 b) the mean value of an upper envelope maxima and lower envelope minima approaches a second predetermined value;
 a fitting device for calculating an envelope far each IMF;
 a derivative calculator for determining a derivative for said envelope;
 a stability spectrum generator for generating a stability spectrum from said IMFs by classifying said vibration data into positive and negative results and separating said positive and negative results;
 generating a non-linearity indicator for said stability spectrum; and
 wherein a non-linearity indicator in said stability spectrum is responsive to said derivative, said non-linearity indicator indicating a transition from stability to instability.

29. A system for analyzing structural vibrations as in claim 28, wherein said sifting device is adapted to extracts IMFs by Empirical Mode Decomposition (EMD).

30. A system for analyzing structural vibrations as in claim 28, wherein said EMD) applies a Hilbert Huang Transform to said vibration data.

31. A system for analyzing structural vibrations as in claim 28 wherein said extracted IMFs have the form $$x(t) = \sum_{j=1}^{n} c_j(t) + r_n;$$

wherein $c_j(t)$ is the $j^{th}$ IMF component of the IMF and $r_n$ is the residual value.

32. A system for analyzing structural vibrations as in claim 28, wherein said fitting device is adapted to fit a splint to IMF envelopes and said system further comprises means for identifying IMF energy.

33. A system for analyzing structural vibrations as in claim 32, wherein said derivative calculator is adapted to takes the derivative of splines.

34. A system for analyzing structural vibrations as in claim 33, wherein the derivative is selectively ignored responsive to a threshold.

35. A system for analyzing vibrations as in claim 34, wherein the threshold is between about 0.5 and about 10%.

36. A system for analyzing vibrations as in claim 34, wherein the threshold is about 1%.

37. A system for analyzing structural vibrations as in claim 34, wherein said threshold is an amplitude ratio cutoff between each spline and corresponding spline derivative, said spine derivative being set to zero whenever the ratio of the amplitude of said each splint to the amplitude of said corresponding spline derivative is below said amplitude ratio cutoff.

38. A system for analyzing structural vibrations as in claim 34, further comprising a smoothing device adapted for smoothing the spline and spline derivative.

39. A system for analyzing structural vibrations as in claim 38, wherein said smoothing smooths the spline and spline derivative by taking a running average of a segment.

40. A system for analyzing structural vibrations as in claim 39, wherein said segment is a selected number of data points, each of said data points corresponding to a time vibration data was taken.

41. A system for analyzing structural vibrations as in claim 28, wherein the non-linearity indicator is identified responsive to said derivative of said spline changing sign.

42. A system for analyzing structural vibrations as in claim 41, further comprising a receiver for receiving vibration data, received said vibration data being stored in said storage device.

* * * * *